US008725613B1

(12) United States Patent
Celka et al.

(10) Patent No.: US 8,725,613 B1
(45) Date of Patent: May 13, 2014

(54) SYSTEMS AND METHODS FOR EARLY ACCOUNT SCORE AND NOTIFICATION

(75) Inventors: Christopher J. Celka, Suwanee, GA (US); Cristian R. Rojas, San Diego, CA (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 0 days.

(21) Appl. No.: 13/094,497

(22) Filed: Apr. 26, 2011

Related U.S. Application Data

(60) Provisional application No. 61/328,536, filed on Apr. 27, 2010.

(51) Int. Cl.
*G06Q 40/00* (2006.01)
(52) U.S. Cl.
USPC .................................. 705/35; 705/36
(58) Field of Classification Search
USPC ....................................... 705/4–44
See application file for complete search history.

(56) References Cited

U.S. PATENT DOCUMENTS

| | | | |
|---|---|---|---|
| 4,827,508 A | 5/1989 | Shear | |
| 4,868,570 A | 9/1989 | Davis | |
| 4,935,870 A | 6/1990 | Burk, Jr. et al. | |
| 5,216,612 A | 6/1993 | Cornett et al. | |
| 5,247,575 A | 9/1993 | Sprague et al. | |
| 5,274,547 A | 12/1993 | Zoffel et al. | |
| 5,325,509 A | 6/1994 | Lautzenheiser | |
| 5,341,429 A | 8/1994 | Stringer et al. | |
| 5,528,701 A | 6/1996 | Aref | |
| 5,555,409 A | 9/1996 | Leenstra, Sr. et al. | |
| 5,630,070 A | 5/1997 | Dietrich et al. | |
| 5,640,551 A | 6/1997 | Chu et al. | |
| 5,655,129 A | 8/1997 | Ito | |
| 5,659,731 A | 8/1997 | Gustafson | |
| 5,666,528 A | 9/1997 | Thai | |
| 5,696,907 A | 12/1997 | Tom | |
| 5,699,527 A | 12/1997 | Davidson | |

(Continued)

FOREIGN PATENT DOCUMENTS

| | | |
|---|---|---|
| EP | 0 419 889 | 4/1991 |
| EP | 0 458 698 | 11/1991 |

(Continued)

OTHER PUBLICATIONS

Burr Ph.D., et al., Utility Payments as Alternative Credit Data: A Reality Check, Asset Builders of America, Inc., Dec. 15, 2006, Pages pp. 1-18, Washington, D.C.

(Continued)

*Primary Examiner* — Frantzy Poinvil
(74) *Attorney, Agent, or Firm* — Knobbe Martens Olson & Bear LLP

(57) ABSTRACT

The embodiments illustrated herein provide systems and methods for predicting or identifying early life account fraud at a point-in-time within existing account portfolios. The identity-level linking of inquiry data described herein allow for detecting inconsistent and/or suspicious use of identity data elements across multiple applications that traditional fraud detection systems may consider to be different consumers. The system can be configured to calculate or generate a fraud score after a credit account is booked and/or opened by a financial institution or other third party. Even though the likelihood of fraud is assessed at the time when an applicant applies for credit, there may still be some applicants that successfully pass through authentication and/or fraud tools.

8 Claims, 14 Drawing Sheets

(56) References Cited

U.S. PATENT DOCUMENTS

| | | |
|---|---|---|
| 5,704,044 A | 12/1997 | Tarter et al. |
| 5,737,732 A | 4/1998 | Gibson et al. |
| 5,754,632 A * | 5/1998 | Smith .................. 379/114.14 |
| 5,765,143 A | 6/1998 | Sheldon et al. |
| 5,768,423 A | 6/1998 | Aref et al. |
| 5,774,692 A | 6/1998 | Boyer et al. |
| 5,778,405 A | 7/1998 | Ogawa |
| 5,797,136 A | 8/1998 | Boyer et al. |
| 5,812,840 A | 9/1998 | Shwartz |
| 5,819,226 A | 10/1998 | Gopinathan et al. |
| 5,822,410 A | 10/1998 | McCausland et al. |
| 5,822,750 A | 10/1998 | Jou et al. |
| 5,825,884 A | 10/1998 | Zdepski et al. |
| 5,832,068 A * | 11/1998 | Smith .................. 379/114.14 |
| 5,835,915 A | 11/1998 | Carr et al. |
| 5,884,289 A | 3/1999 | Anderson et al. |
| 5,905,985 A | 5/1999 | Malloy et al. |
| 5,924,082 A | 7/1999 | Silverman et al. |
| 5,950,179 A | 9/1999 | Buchanan et al. |
| 5,963,932 A | 10/1999 | Jakobsson et al. |
| 6,014,632 A | 1/2000 | Gamble et al. |
| 6,018,723 A | 1/2000 | Siegel et al. |
| 6,029,149 A | 2/2000 | Dykstra et al. |
| 6,029,154 A | 2/2000 | Pettitt |
| 6,038,551 A | 3/2000 | Barlow et al. |
| 6,044,351 A | 3/2000 | Jones |
| 6,044,352 A | 3/2000 | Deavers |
| 6,067,522 A | 5/2000 | Warady et al. |
| 6,070,141 A | 5/2000 | Houvener et al. |
| 6,073,104 A | 6/2000 | Field |
| 6,073,140 A | 6/2000 | Morgan et al. |
| 6,088,686 A | 7/2000 | Walker et al. |
| 6,094,643 A | 7/2000 | Anderson et al. |
| 6,098,052 A | 8/2000 | Kosiba et al. |
| 6,108,641 A | 8/2000 | Kenna et al. |
| 6,119,103 A * | 9/2000 | Basch et al. .................. 705/35 |
| 6,121,901 A | 9/2000 | Welch et al. |
| 6,128,624 A | 10/2000 | Papierniak et al. |
| 6,144,957 A | 11/2000 | Cohen et al. |
| 6,151,601 A | 11/2000 | Papierniak et al. |
| 6,157,707 A * | 12/2000 | Baulier et al. .................. 379/189 |
| 6,185,543 B1 | 2/2001 | Galperin et al. |
| 6,223,171 B1 | 4/2001 | Chaudhuri et al. |
| 6,254,000 B1 | 7/2001 | Degen et al. |
| 6,256,630 B1 | 7/2001 | Gilai et al. |
| 6,263,334 B1 | 7/2001 | Fayyad et al. |
| 6,263,337 B1 | 7/2001 | Fayyad et al. |
| 6,304,869 B1 | 10/2001 | Moore et al. |
| 6,311,169 B2 | 10/2001 | Duhon |
| 6,330,546 B1 | 12/2001 | Gopinathan et al. |
| 6,339,769 B1 | 1/2002 | Cochrane et al. |
| 6,366,903 B1 | 4/2002 | Agrawal et al. |
| 6,418,436 B1 | 7/2002 | Degen et al. |
| 6,457,012 B1 | 9/2002 | Jatkowski |
| 6,496,819 B1 | 12/2002 | Bello et al. |
| 6,505,168 B1 | 1/2003 | Rothman et al. |
| 6,513,018 B1 | 1/2003 | Culhane |
| 6,523,041 B1 | 2/2003 | Morgan et al. |
| 6,574,623 B1 | 6/2003 | Laung et al. |
| 6,598,030 B1 | 7/2003 | Siegel et al. |
| 6,611,816 B2 | 8/2003 | Lebda et al. |
| 6,651,220 B1 | 11/2003 | Penteroudakis et al. |
| 6,658,393 B1 * | 12/2003 | Basch et al. .................. 705/38 |
| 6,714,918 B2 | 3/2004 | Hillmer et al. |
| 6,738,748 B2 | 5/2004 | Wetzer |
| 6,748,426 B1 | 6/2004 | Shaffer et al. |
| 6,766,327 B2 | 7/2004 | Morgan, Jr. et al. |
| 6,804,701 B2 | 10/2004 | Muret et al. |
| 6,850,895 B2 | 2/2005 | Brodersen et al. |
| 6,934,714 B2 | 8/2005 | Meinig |
| 7,003,504 B1 | 2/2006 | Angus et al. |
| 7,028,013 B2 | 4/2006 | Saeki |
| 7,035,855 B1 | 4/2006 | Kilger et al. |
| 7,050,989 B1 | 5/2006 | Hurt et al. |
| 7,076,462 B1 | 7/2006 | Nelson et al. |
| 7,082,435 B1 | 7/2006 | Guzman et al. |
| 7,191,150 B1 | 3/2007 | Shao et al. |
| 7,197,468 B1 | 3/2007 | Patricelli et al. |
| 7,200,602 B2 | 4/2007 | Jonas |
| 7,234,156 B2 | 6/2007 | French et al. |
| 7,246,740 B2 | 7/2007 | Swift et al. |
| 7,263,506 B2 | 8/2007 | Lee et al. |
| 7,277,900 B1 | 10/2007 | Ganesh et al. |
| 7,310,617 B1 | 12/2007 | Cunningham |
| 7,333,635 B2 | 2/2008 | Tsantes et al. |
| 7,367,011 B2 | 4/2008 | Ramsey et al. |
| 7,370,044 B2 | 5/2008 | Mulhern et al. |
| 7,376,603 B1 | 5/2008 | Mayr et al. |
| 7,403,942 B1 | 7/2008 | Bayliss |
| 7,428,509 B2 | 9/2008 | Klebanoff |
| 7,433,855 B2 | 10/2008 | Gavan et al. |
| 7,433,864 B2 | 10/2008 | Malik |
| 7,458,508 B1 | 12/2008 | Shao et al. |
| 7,467,127 B1 | 12/2008 | Baccash et al. |
| 7,475,118 B2 | 1/2009 | Leiba et al. |
| 7,483,842 B1 | 1/2009 | Fung et al. |
| 7,503,489 B2 | 3/2009 | Heffez |
| 7,512,221 B2 | 3/2009 | Toms |
| 7,543,739 B2 * | 6/2009 | Brown et al. .................. 235/380 |
| 7,546,271 B1 * | 6/2009 | Chmielewski et al. .......... 705/38 |
| 7,548,886 B2 | 6/2009 | Kirkland et al. |
| 7,575,157 B2 | 8/2009 | Barnhardt et al. |
| 7,581,112 B2 | 8/2009 | Brown et al. |
| 7,596,716 B2 | 9/2009 | Frost et al. |
| 7,610,216 B1 | 10/2009 | May et al. |
| 7,630,933 B2 | 12/2009 | Peterson et al. |
| 7,647,344 B2 | 1/2010 | Skurtovich et al. |
| 7,653,592 B1 | 1/2010 | Flaxman et al. |
| 7,668,769 B2 | 2/2010 | Baker et al. |
| 7,672,833 B2 | 3/2010 | Blume et al. |
| 7,686,214 B1 | 3/2010 | Shao et al. |
| 7,689,487 B1 | 3/2010 | Britto et al. |
| 7,698,163 B2 | 4/2010 | Reed et al. |
| 7,707,059 B2 | 4/2010 | Reed et al. |
| 7,725,300 B2 | 5/2010 | Pinto et al. |
| 7,747,559 B2 | 6/2010 | Leitner et al. |
| 7,756,789 B2 | 7/2010 | Welker et al. |
| 7,761,379 B2 | 7/2010 | Zoldi et al. |
| 7,778,885 B1 | 8/2010 | Semprevivo et al. |
| 7,856,494 B2 | 12/2010 | Kulkarni |
| 7,870,078 B2 | 1/2011 | Clark et al. |
| 7,877,304 B1 * | 1/2011 | Coulter .................. 705/35 |
| 7,912,865 B2 | 3/2011 | Akerman et al. |
| 7,941,363 B2 | 5/2011 | Tanaka et al. |
| 7,983,932 B2 | 7/2011 | Kane |
| 7,991,689 B1 | 8/2011 | Brunzell et al. |
| 8,001,042 B1 | 8/2011 | Brunzell et al. |
| 8,024,264 B2 | 9/2011 | Chaudhuri et al. |
| 8,037,097 B2 | 10/2011 | Guo et al. |
| 8,060,424 B2 | 11/2011 | Kasower |
| 8,065,233 B2 * | 11/2011 | Lee et al. .................. 705/44 |
| 8,095,458 B2 | 1/2012 | Peterson et al. |
| 8,104,679 B2 * | 1/2012 | Brown .................. 235/380 |
| 8,127,986 B1 | 3/2012 | Taylor et al. |
| 8,214,262 B1 | 7/2012 | Semprevivo et al. |
| 8,224,723 B2 * | 7/2012 | Bosch et al. .................. 705/35 |
| 8,271,378 B2 | 9/2012 | Chaudhuri et al. |
| 8,285,656 B1 | 10/2012 | Chang et al. |
| 8,364,588 B2 | 1/2013 | Celka et al. |
| 2001/0037332 A1 | 11/2001 | Miller et al. |
| 2002/0099824 A1 | 7/2002 | Bender et al. |
| 2002/0138297 A1 | 9/2002 | Lee |
| 2002/0173984 A1 | 11/2002 | Robertson et al. |
| 2002/0184255 A1 | 12/2002 | Edd et al. |
| 2002/0194103 A1 | 12/2002 | Nabe |
| 2003/0018549 A1 | 1/2003 | Fei et al. |
| 2003/0050882 A1 | 3/2003 | Degen et al. |
| 2003/0097320 A1 | 5/2003 | Gordon |
| 2003/0115133 A1 | 6/2003 | Bian |
| 2003/0191731 A1 | 10/2003 | Stewart et al. |
| 2003/0212654 A1 | 11/2003 | Harper et al. |
| 2003/0229892 A1 | 12/2003 | Sardera |
| 2004/0039686 A1 | 2/2004 | Klebanoff |
| 2004/0054619 A1 | 3/2004 | Watson et al. |

(56) References Cited

U.S. PATENT DOCUMENTS

| | | | |
|---|---|---|---|
| 2004/0064401 A1 | 4/2004 | Palaghita et al. |
| 2004/0098625 A1 | 5/2004 | Lagadec et al. |
| 2004/0103147 A1 | 5/2004 | Flesher et al. |
| 2004/0117235 A1 | 6/2004 | Shacham |
| 2004/0128150 A1 | 7/2004 | Lundegren |
| 2004/0153448 A1 | 8/2004 | Cheng et al. |
| 2004/0199789 A1 | 10/2004 | Shaw et al. |
| 2004/0220896 A1 | 11/2004 | Finlay et al. |
| 2004/0225596 A1 | 11/2004 | Kemper et al. |
| 2004/0230534 A1 | 11/2004 | McGough |
| 2004/0243588 A1 | 12/2004 | Tanner et al. |
| 2005/0010513 A1 | 1/2005 | Duckworth et al. |
| 2005/0021476 A1 | 1/2005 | Candella et al. |
| 2005/0097051 A1 | 5/2005 | Madill, Jr. et al. |
| 2005/0137899 A1 | 6/2005 | Davies et al. |
| 2005/0154665 A1 | 7/2005 | Kerr |
| 2005/0192008 A1 | 9/2005 | Desai et al. |
| 2005/0256809 A1 | 11/2005 | Sadri |
| 2006/0020611 A1 | 1/2006 | Gilbert et al. |
| 2006/0036543 A1 | 2/2006 | Blagg et al. |
| 2006/0041464 A1 | 2/2006 | Powers et al. |
| 2006/0074991 A1 | 4/2006 | Lussier et al. |
| 2006/0095363 A1 | 5/2006 | May |
| 2006/0149674 A1 | 7/2006 | Cook et al. |
| 2006/0184585 A1 | 8/2006 | Grear et al. |
| 2006/0195688 A1 | 8/2006 | Drissi et al. |
| 2006/0202012 A1 | 9/2006 | Grano et al. |
| 2006/0242049 A1 | 10/2006 | Haggerty et al. |
| 2006/0271457 A1 | 11/2006 | Romain et al. |
| 2006/0282359 A1 | 12/2006 | Nobili et al. |
| 2007/0059442 A1 | 3/2007 | Sabeta |
| 2007/0112667 A1 | 5/2007 | Rucker |
| 2007/0124256 A1 | 5/2007 | Crooks et al. |
| 2007/0220611 A1 | 9/2007 | Socolow et al. |
| 2007/0282730 A1 | 12/2007 | Carpenter et al. |
| 2008/0052182 A1 | 2/2008 | Marshall |
| 2008/0059224 A1 | 3/2008 | Schechter |
| 2008/0059317 A1 | 3/2008 | Chandran et al. |
| 2008/0059364 A1 | 3/2008 | Tidwell et al. |
| 2008/0103800 A1 | 5/2008 | Domenikos et al. |
| 2008/0109315 A1 | 5/2008 | Huang et al. |
| 2008/0162383 A1 | 7/2008 | Kraft |
| 2008/0172324 A1 | 7/2008 | Johnson |
| 2008/0175360 A1 | 7/2008 | Schwarz et al. |
| 2008/0301016 A1 | 12/2008 | Durvasula et al. |
| 2009/0018996 A1 | 1/2009 | Hunt et al. |
| 2009/0044279 A1 | 2/2009 | Crawford et al. |
| 2009/0048877 A1 | 2/2009 | Binns et al. |
| 2009/0106846 A1 | 4/2009 | Dupray et al. |
| 2009/0112650 A1 | 4/2009 | Iwane |
| 2009/0126013 A1 | 5/2009 | Atwood et al. |
| 2009/0164380 A1* | 6/2009 | Brown | 705/65 |
| 2009/0222308 A1 | 9/2009 | Zoldi et al. |
| 2009/0248581 A1* | 10/2009 | Brown | 705/67 |
| 2010/0142698 A1 | 6/2010 | Spottiswoode et al. |
| 2010/0185546 A1 | 7/2010 | Pollard |
| 2010/0250411 A1 | 9/2010 | Ogrodski |
| 2011/0137760 A1 | 6/2011 | Rudie et al. |
| 2011/0164746 A1 | 7/2011 | Nice et al. |
| 2011/0196791 A1* | 8/2011 | Dominguez | 705/44 |
| 2012/0030771 A1* | 2/2012 | Pierson et al. | 726/26 |
| 2012/0110677 A1 | 5/2012 | Abendroth et al. |
| 2012/0158574 A1 | 6/2012 | Brunzell et al. |

FOREIGN PATENT DOCUMENTS

| | | |
|---|---|---|
| EP | 0 559 358 | 9/1993 |
| EP | 0 977 128 | 2/2000 |
| EP | 1 028 401 | 8/2000 |
| EP | 0 772 836 | 12/2001 |
| GB | 2 392 748 A | 3/2004 |
| WO | WO 95/34155 | 12/1995 |
| WO | WO 98/41931 | 9/1998 |
| WO | WO 98/41932 | 9/1998 |
| WO | WO 98/41933 | 9/1998 |
| WO | WO 99/17225 | 4/1999 |
| WO | WO 99/17226 | 4/1999 |
| WO | WO 99/38094 | 7/1999 |
| WO | WO 00/004465 | 1/2000 |
| WO | WO 02/13047 | 2/2002 |
| WO | WO 2004/046882 | 6/2004 |
| WO | WO 2004/114160 | 12/2004 |

OTHER PUBLICATIONS

Cowie, Norman, Warning Bells & the Bust-Out, Business Credit, Jul. 1, 2000.

eFunds Corporation, Data & Decisioning, Debit Report, as printed on Apr. 1, 2007, http://www.efunds.com/web/industry-solutions/financial-services/frm-debit-report/htm, 1 page.

Fair Isaac Introduces Falcon One System to Combat Fraud, Business Wire, May 5, 2005.

Fair Isaac Offers New Fraud Tool, National Mortgage News & Source Media, Inc., Jun. 13, 2005.

Jacob, Katy et al., A Case Study of Checking Account Inquiries and Closures in Chicago, The Center for Financial Services Innovation, Nov. 2006.

Tackling the Issue of Bust-Out Fraud, Retail Banker International, Jul. 24, 2007.

"D&B Corporate Family Linkage", D&B Internet Access for U.S. Contract Customers, https://www.dnb.com/ecomp/help/linkage.htm as printed Dec. 17, 2009, pp. 1.

"Ficticious Business Name Records", Westlaw Database Directory, http://directoy.westlaw.com/scope/default.asp?db=FBN-ALL&RS-W&VR=2.0 as printed Dec. 17, 2009, pp. 5.

"Financing Medical Procedures a Lucrative But Risky Business," Credit Risk Management Report, vol. 10, Issue 15, 2 pgs., dated Aug. 7, 2000.

"Improving the Implementation of State Children's Health Insurance Programs for Adolescents Report of an Invitational Conference Sponsored by the American Academy of Pediatrics, Section on Adolescent Health," PEDIATRICS, Official Journal of the American Academy of Pediatrics, Section on Adolescent Health, Sep. 26-27, 1999, 9 pages.

"Name Availability Records", Westlaw Database Directory, http://www.directoy.westlaw.com/scope/default.asp?db=NA-ALL&RS=W&VR=2.0 as printed Dec. 17, 2009, pp. 5.

"Web Site Fuels Elective Surgery Trend; The Complete Resource to Paying for Cosmetic Surgery, Laser Vision Correction and Cosmetic Dentistry," Business Wire, 2 pages, dated Apr. 7, 1999.

An Expert System for Determining Medicaid Eligibility, Journal of Medical Systems, vol. 12, Nov. 5, 1988, in 10 pages.

Bitran et al., "Mailing Decisions in Catalog Sales Industry", Management Science (JSTOR), vol. 42, No. 9, pp. 1364-1381, Sep. 1996.

Chores & Allowances. "Do Kids Have Credit Reports?", Oct. 15, 2007, http://choresandallowances.blogspot.com/2007/10/do-kids-have-credit-reports.html.

Cohen et al., "Optimizer: IBM's Multi Echelon Inventory System for Managing Service Logistics", Interfaces, vol. 20, pp. 65-82, Jan.-Feb. 1990.

Experian, Enabling e-business, White Paper, Jan. 2001.

Experian, Instant Prescreen: Offer preapproved credit at the point of sale, Oct. 2000.

Gibbs, Adrienne; "Protecting Your Children from Identity Theft," Nov. 25, 2008, http://www.creditcards.com/credit-card-news/identity-ID-theft-and-kids-children-1282.php.

Haffar, Imad, "'SPAM': A Computer Model for Management of Spare-Parts Inventories in Agricultural Machinery Dealerships", Computers and Electronics in Agriculture, vol. 12, Issue 4, Jun. 1995, pp. 323-332.

Handfield, Robert B. et al., "Managing Component Life Cycles in Dynamic Technological Environments", International Journal of Purchasing and Materials Management, Tempe, vol. 30, Iss. 2, p. 20, 9 pgs., Spring 1994, ProQuest ID 590096.

ID Theft Assist, "Do You Know Where Your Child's Credit Is?", Nov. 26, 2007, http://www.idtheftassist.com/pages/story14.

Inderfurth et al., "Decision Support for Spare Parts Acquisition in Post Product Life Cycle", Central European Journal of Operations

(56) References Cited

OTHER PUBLICATIONS

Research, vol. 16, pp. 17-42, 2008 [Initially published online Dec. 21, 2007].
KäKI, Anssi, "Forecasting in End-Of-Life Spare Parts Procurement", Master's Thesis—Helsinki University of Technology System Analysis Laboratory, Jul. 27, 2007.
Klein, et al., "An Econometric Model of the United States: 1929-1952", Amsterdam: North-Holland, 1955.
Klein, L.R; "The Keynesian Revolution", New York: MacMillan, 1947.
Krupp, James A.G.; "Forecasting for the Automotive Aftermarket"; The Journal of Business Forecasting Methods & Systems; Winter 1993-1994; 12, 4; ABI/Inform Global; pp. 8-12.
Lapide, Larry, "New Developments in Business Forecasting", The Journal of Business Forecasting, pp. 12-14, Spring 2002.
Lee, W.A.; "Experian, on Deal Hunt, Nets Identity Theft Insurer", American Banker: The Financial Services Daily, 1pg., New York, NY, Jun. 4, 2003.
Li et al., "Automatic Verbal Information Verification for User Authentication", IEEE Transactions on Speech and Audio Processing, vol. 8, No. 5, Sep. 2000, pp. 585-596.
Moore, John R., Jr. "Forecasting and Scheduling for Past-Model Replacement Parts" Management Science, Application Series, vol. 18, No. 4, Part 1, Dec. 1971, pp. B200-B213.
Packer, A. H., "Simulation and Adaptive Forecasting an Applied to Inventory Control", Operations Research, vol. 15, No. 4, pp. 660-679, Jul. 1965.
Paustian, Chuck; "Every Cardholder a King Customers get the Full Treatment at Issuers' Web Sites"; Card Marketing; New York; vol. 5, Issue, 3; pp. 1-3; Mar. 2001.
Peters, Peter-Paul, "A Spare Parts Configurator for the European Service Business" (Graduation Report); Honeywell, Industrial Service Logistic Center; Amsterdam, The Netherlands; 80 Pgs.; Mar. 2000.
Rawe, Julie; "Identity Thieves", Time Bonus Section, Inside Business, Feb. 2002.
Roos, Gina, "Web-Based Service Helps OEMs Cure Parts Obsolescence Blues", Electronic Engineering Times, p. 86, Oct. 8, 2001, Dialog 09056737 78968668.
Santarini, Michael, "Forecasts the Probably Obsolescence of Components—Module Predicts Parts Life", Electronic Engineering Times, Jan. 11, 1999, p. 48(1), Dialog 0607160353548246.
Smith, Wendell R., "Product Differentiation and Market Segmentation as Alternative Marketing Strategies", The Journal of Marketing, pp. 3-8, vol. XXI, The American Marketing Association, Brattleboro, Vermont, Jul. 1956.
Stone, "Linear Expenditure Systems and Demand Analysis: An Application to the Pattern of British Demand", The Economic Journal: The Journal of the Royal Economic Society, pp. 511-527, vol. LXIV, Macmillan & Co., London, Sep. 1954.
Sullivan, Laurie, "Obsolete-Parts Program Thriving", EBN, Manhasset, Issue 1296, p. 26, Jan. 2002, ProQuest 10 101195090.
Webster, Lee R., "Failure Rates & Life Cycle Costs", Consulting-Specifying Engineer; 23, 4; ABI/INFROM Global, Apr. 1998, p. 42.
Working, Holbrook, "Statistical Laws of Family Expenditure", Journal of the American Statistical Association, pp. 43-56, vol. 38, American Statistical Association, Washington, D.C., Mar. 1943.
Elmasri et al., "Fundamentals of Database Systems, Third Edition (Excerpts),"pp. 253, 261, 268-270, 278-280, 585, 595, Jun. 2000.
Vamosi, Robert, "How to Handle ID Fraud's Youngest Victims," Nov. 21, 2008, http://news.cnet.com/8301-10789_3-10105303-57.html.

* cited by examiner

SYSTEMS AND METHODS FOR EARLY ACCOUNT SCORE AND NOTIFICATION

CROSS-REFERENCE TO RELATED APPLICATIONS

The present application claims the benefit under 35 U.S.C. 119(c) to U.S. Provisional Application No. 61/328,536, titled "SYSTEMS AND METHODS FOR EARLY ACCOUNT SCORE AND NOTIFICATION" and filed Apr. 27, 2010, which is hereby incorporated by reference in its entirety, including specifically but not limited to the systems and methods relating to early account score and notification.

BACKGROUND

1. Field

This disclosure generally relates to financial data modeling and processing and more particularly to improved methods and systems for identifying early life/post book fraud.

2. Description

Various financial service providers provide credit accounts, such as mortgages, automobile loans, credit card accounts, and the like to consumers and/or businesses. During the application process for such credit accounts, financial service providers will generally conduct a fraud assessment and/or credit worthiness assessment of the applicant before opening or approving such a credit account. For example, financial service providers may obtain a FICO score for a particular applicant before issuing a credit account.

SUMMARY

For purposes of describing the invention, certain aspects, advantages, and novel features of various embodiments of the invention have been described herein. Of course, it is to be understood that not necessarily all such aspects, advantages, or features will be embodied in any particular embodiment of the invention.

In an embodiment, a system or method for detecting or predicting early life account fraud comprises, receiving the identity data elements of a consumer, obtaining data related to the consumer, inputting the data in an early life account fraud monitoring model, and outputting an early life account fraud score. The obtaining data can comprise obtaining credit inquiry data and/or authentication inquiry data. In an embodiment, credit inquiry data and/or authentication inquiry data is related to the consumer if inquiry data comprises at least one common identity data element that is the same as an identity data elements of the consumer. The system or method can further comprise linking related inquiry data to the consumer. In an embodiment, the system or method is configured to identify or determine differences in identity data elements between the consumer and the linked or related inquiry data. The early life account fraud monitoring model can be configured to receive this difference data to determine if the consumer exhibits specific attributes that can be used to generate an early life account fraud score. The early life account fraud score can be stored with other early life account fraud scores in a log file or batch file that can be sent to or retrieved by a user on a batch or periodic or real-time basis. Alternatively, the early life account fraud score can be stored with other early life account fraud scores in a database accessible by a user.

In an embodiment, a computer-implemented method for early life account fraud monitoring comprises: identifying by a processor a consumer for early life account fraud monitoring, the consumer comprising a plurality of identity data elements and is associated with at least one financial account; accessing by the processor one or more databases to obtain credit inquiry data and authentication inquiry data associated with the consumer, wherein the credit inquiry data and authentication inquiry data is associated with the consumer if the credit inquiry data and authentication inquiry data comprises at least one of the plurality of identity data elements of the consumer; applying by the processor an early life account fraud model to the credit inquiry data and authentication inquiry data to predict a likelihood of fraud, wherein the predicting is based on the early life account fraud model detecting differences in identity data elements between the consumer and the credit inquiry data and authentication inquiry data; generating by the processor an early life account fraud score based on the applying the early life account fraud model; and outputting the early life account fraud score for the consumer.

Early life account fraud monitoring can involve analyzing one or more newly opened financial accounts that successfully passed a fraud detection application process by using real and/or fictitious identification data and identifying such fraudulent financial accounts after the financial account has been opened or booked for a period. Generally, credit inquiry data comprises requesting for a credit bureau data for a consumer from third parties. In general, authentication inquiry data comprises inquiries from third parties to a credit bureau wherein each inquiry is a request to verify and/or authenticate an identity or identification information of a consumer.

In an embodiment, a computer system for early life account fraud monitoring comprises: a computer processor configured to execute modules comprising at least: an input module configured to identify a consumer for early life account fraud monitoring, the consumer comprising a plurality of identity data elements and is associated with at least one financial account; an inquiry data access module configured to access one or more databases to obtain credit inquiry data and authentication inquiry data associated with the consumer, wherein the credit inquiry data and authentication inquiry data is associated with the consumer if the credit inquiry data and authentication inquiry data comprises at least one of the plurality of identity data elements of the consumer.

The computer system can also comprise a monitoring module configured to apply an early life account fraud model to the credit inquiry data and authentication inquiry data to predict a likelihood of fraud, wherein the predicting is based on the early life account fraud model detecting differences in identity data elements between the at least one financial account and the credit inquiry data and authentication inquiry data; a scoring module configured to generate an early life account fraud score based on the applying the early life account fraud model; and an output module configured to output the early life account fraud score. The computer system can be configured to access substantially only credit inquiry data and authentication inquiry data.

BRIEF DESCRIPTION OF THE DRAWINGS

Features and aspects, and advantages of the embodiments of the invention are described in detail below with reference to the drawings of various embodiments, which are intended to illustrate and not to limit the invention. The drawings include the following figures in which.

DETAILED DESCRIPTION OF THE EMBODIMENT

Figure 1:
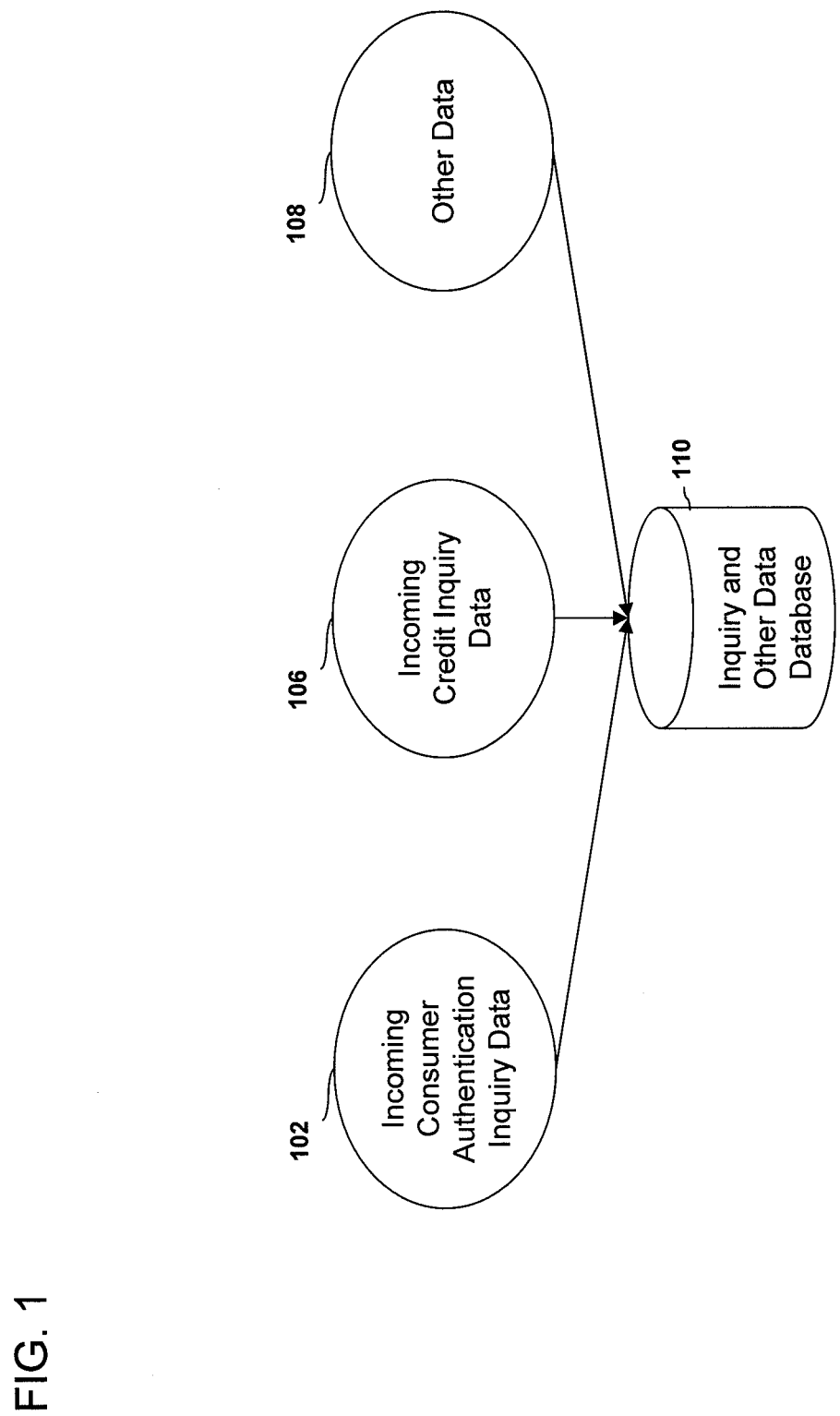
FIG. 1 is a block diagram depicting an embodiment of a database that includes data obtained from various data sources.

In general, financial service providers or other third parties attempt to reduce the amount of fraud by assessing an applicant's authentication information and credit worthiness at the time when an applicant is applying for credit. Generally, authentication information can be verified by submitting the identity data to be verified in an authentication inquiry request to a credit bureau, which responds by indicating the likelihood or risk that identity data or the application associated with the identity data is fraudulent. In general, credit worthiness can be checked by submitting the identity data to be checked in a credit inquiry request to a credit bureau, which responds by returning credit bureau data (for example, a credit report or score) correlated to the submitted identity data. Financial service providers or other third parties include, without limitation, banks, retailers, auto financing entities, educational financing institutions, utility companies, government entities, medical institutions, insurance companies, human resources/personnel departments, or any other client that issues credit to a consumer or other entity, or checks/verifies the identity of an individual.

Despite the use of such fraud detection tools, some consumers that are intent on committing fraud may successfully pass through such fraud detection processes. For example, a consumer may provide real and/or fake identification information (for example, first party or third party fraud) thereby allowing the consumer to pass through traditional fraud detection processes or defenses. Under this scenario, a credit account would be opened for this consumer who should not be awarded credit. Accordingly, there is a need for a system that may identify such consumers or accounts after a credit account has been opened and/or booked. Such a system would allow financial service providers or other third parties to reduce the amount of fraud or loss arising from such applicants.

In some cases, traditional scoring models are not completely successful in flagging these types of scenarios because some applicants have avoided or circumvented existing fraud detection tools. Accordingly, some fraudulent credit accounts are not detected early and are allowed to exist until substantial losses are incurred by the financial service provider. Some financial service providers typically write off such credit losses as bad debt. Accordingly, there is a need for an early detection process to mitigate such losses for financial service providers.

To augment traditional fraud detection tools, which generally look at whole person data for a consumer applying for credit, a system can be configured to initially review and analyze specific identity data elements in isolation. For example, a system can be configured to initially pull inquiry data based on a name identity data element for a consumer being monitored. Such pulled data can be linked to the consumer being monitored. The system can be configured to analyze the other identity data elements for the consumer with the other identity data elements associated with the pulled inquiry data. Based on this analysis, the system can be configured to identify similarities and/or differences between the other identity data elements and such differences can be used and inputted into an early life account fraud model that generates a score to predict early life account fraud. The model can be applied to a plurality of consumers to generate a plurality of early life account scores that can be stored in a batch file that is made accessible or is delivered periodically to a user.

There are numerous advantages to using various embodiments of the foregoing system. For example, inquiry data that traditional fraud detection systems would identify as data associated with entities that are different from the consumer being monitored can be linked to the consumer by the system based on the commonality of one or more identity data elements. In other words, traditional fraud detection systems may only link inquiry data where the identity data elements are all the same, or all substantially the same, between the consumer being monitored and the inquiry data. As a result, traditional fraud detection systems may not analyze such inquiry data, and therefore may miss an opportunity to detect fraud. In contrast, an early life account fraud system can be configured to review inquiry data that is linked to the consumer by a single, common identity data element. By linking additional inquiry data to the consumer, the system has additional data to analyze, and therefore, has additional opportunities to detect fraud.

Another advantage of various embodiment of the system described above is the system utilizes inquiry data, both credit inquiry data and authentication inquiry data, whereas traditional fraud detection systems may not. The use of inquiry data allows the system to analyze data across multiple industries, thereby allowing the system greater opportunity to detect fraud. Additionally, large amounts of inquiry data are generated daily. Therefore, the system generally has access to a continuous supply of fresh data to analyze and detect fraud. As a result of utilizing inquiry data, the system has greater opportunity to discover, suspicious activity.

In view of the foregoing advantageous, the embodiments illustrated herein provide systems and methods for predicting or identifying early life account fraud at a point-in-time within existing account portfolios. The identity-level linking of inquiry data described above allow for detecting inconsistent and/or suspicious use of identity data elements across multiple applications that traditional fraud detection system may consider to be different consumers. The system can be configured to calculate or generate a fraud score after a credit account is booked and/or opened by a financial institution. Even though the likelihood of fraud is assessed at the time when an applicant applies for credit, there may still be some applicants that successfully pass through authentication and/or fraud tools.

Accordingly, the systems and methods described herein may be used to generate a fraud score and/or an alert after a credit account has been booked and/or opened. In an embodiment, the system obtains or gathers additional information about an applicant by monitoring and/or linking the identity data elements of a consumer to be monitored with other recent inquiry data having similar identity data elements. For example, similar data may include, without limitation, name, address, Social Security number, phone number, date of birth, or the like. By reviewing and/or analyzing later submitted inquiry data, the system determines whether fraud is likely to occur in the consumer.

Attributes based on the data appearing in recent inquiry data are then used to calculate a fraud score and/or an alert. Attributes may be formed by using, summarizing, and categorizing the inquiry data along with other attributes. By reviewing and analyzing other recent or later generated inquiry data submitted by the same and/or other financial institutions, the system identifies and/or predicts whether fraud has been committed or is likely to exist in an original credit account of a consume.

Some example attributes are:
Number of times the same phone number is used with a different Social Security number;
Number of times the same Social Security number is used with a different date of birth;
Number of times the same date of birth with a different Social Security number;
Number of Social Security numbers in the last X days;
Number of times the same Social Security number is used with a different telephone number in the last X days;
Number of times the same Social Security number is used with a different telephone number but with the same telephone exchange in the last X days;
Number of times a particular Social Security number is used/linked with other credit account applications, wherein the other applications have a high-risk address flag or other alert (for example, the number of hits in the last days);
Number of telephone numbers in the last X days;
Number of times the same telephone number is use with a different Social Security number in the last X days; and
Number of times the same name and year of birth are used in the last X days.

The attributes may be automatically set, selected, or changed by a user of the system. A client may also set parameters as to when the system should send the client an alert.

In order to decrease fraud losses in an original account and/or in other credit accounts opened after the original account, the score and/or the alert is calculated, generated, and returned to a financial service provider in a timely manner. For example, the system generates and sends the score and/or alert as soon as new inquiry data is received and analyzed. By generating and/or sending the score and/or alert quickly (such as, in real-time) the financial service provider can close the credit account, reduce the credit limit, or take some other action before the consumer consumes all of the credit provided in the credit account. In other embodiments, the system calculates, generates, and/or sends the score and/or alert on a periodic or batch basis. For example, the system calculates, generates, and/or sends the score and/or alert based on a time period (for example, 7 days, 14 days, 21 days, 90 days, and/or the like).

In an embodiment, the system reviews the attributes based on the identity data elements analyzed over a plurality of inquiry data requests for credit accounts and the parameters set by a financial service provider. Based on the review, the system generates and/or sends trigger alerts to financial service provider. For example, a credit card provider may instruct the system to send an alert when the system encounters a consumer that has applied for three credit card applications within a certain period of time using the same name but different social security numbers. As another example, a credit card provider may instruct the system to send an alert when the system encounters a credit account holder that has applied for five other credit accounts with the last seven days. In another example, a credit card provider may instruct the system to send a score and/or an alert when the system encounters an applicant applying for two or more credit card applications, using the same Social Security number but with at least two substantially different phone numbers.

Various attributes and/or combinations of attributes may be used to generate a score and/or trigger an alert. By analyzing recent inquiry data after an original consumer credit account has been processed and/or booked, the system detects fraud in the original credit account before substantial losses are generated for the financial service provider.

Embodiments of the invention will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described. In addition, it is recognized that a feature of one embodiment may be included as a feature in a different embodiment.

Data Sources

FIG. 1 is a diagram illustrating an embodiment of a consumer inquiry and other data database 110. The consumer inquiry and other data database 110 includes data obtained from various data sources, including but not limited to, incoming consumer authentication inquiry data 102, =incoming credit inquiry data 106, and other data 108. In addition, the data includes externally stored and/or internally stored date. The consumer inquiry and other data database 110 may also include client data, public records data, and data from other third party databases. In some embodiments, the consumer inquiry and other data database 110 includes only a subset of the data available from the various data sources set forth above.

Incoming consumer authentication inquiry data 102 includes inquiries from financial service providers or other third parties to a credit bureau wherein the inquiry is a request to verify and/or authenticate a consumer's identity or identification information. The Precise ID™ platform offered by Experian® is an example of a system equipped to process such inquiries from financial service providers and to provide authentication and detection capabilities. Incoming credit inquiry data 106 includes requests for a credit report or other credit bureau data for a consumer or an applicant from financial service providers or other third parties.

Early Account Monitoring Process

Figure 2:
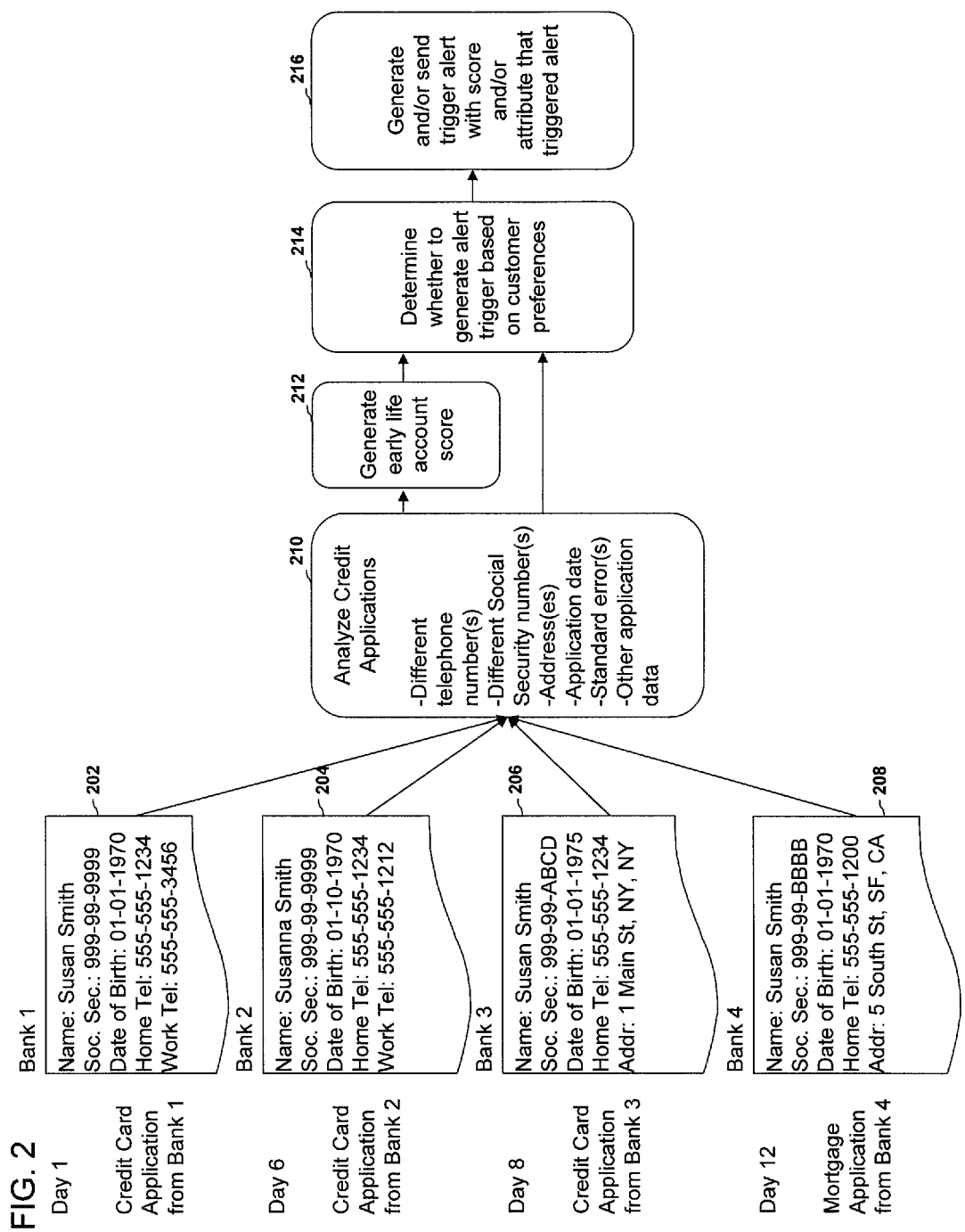
FIG. 2 illustrates an embodiment of an early life account monitoring process.

FIG. 2 illustrates an embodiment of application data, derived from various financial service providers or other third parties, which is processed and analyzed to generate an early account score and/or to generate and send a trigger alert. In an embodiment, the financial service providers or other third parties will generate credit inquiries or authentication inquiries for submission to a credit bureau based on identity data provided in application data. Application 202 is a credit card application from Bank 1 which includes various credit application data elements. Application 202 identifies the name of the applicant as Susan Smith having a Social Security number of 999-99-9999, a date of birth of 01-01-1970, a home telephone number of 555-555-1234, and a work telephone number of 555-555-3456. Application 204 is a credit card application from Bank 2. The credit card application 204 identifies the applicant name as Susanna Smith having a Social Security number of 999-99-9999, a date of birth of 01-10-1970, a home telephone number of 555-555-1234, and a work telephone number of 555-555-1212.

Application 206 is another credit card application, however, this application is from Bank 3. Application 206 identifies the applicant as Susan Smith having a Social Security number of 999-99-ABCD, a date of birth of 01-01-1975, a home telephone number of 555-5555-1234, and an address of 1 Main Street, New York, N.Y.. Application 208 is a mortgage application from Bank 4. Mortgage application 208 lists the applicant as Susan Smith having a Social Security number of 999-99-BBBB, a date of birth of 01-01-1970, a home telephone number of 555-555-1200, and an address of 5 South Street, San Francisco, Calif.

In analyzing the credit applications above, the system identifies applications or inquiries for credit having similar data. For example, the applications 202, 204, 206, and 208 all identify the applicant as a person having the last name Smith. In most of the applications, the first name is identified as Susan. However, in application 204 the applicant's first name is identified as Susanna. In analyzing the credit applications, the system identifies application data elements and/or attributes that are different. For example, at block 210 the system detects different telephone number(s), different Social Security number(s), address(es), application date, standard error(s), and/or other application data. The system also determines whether the difference is slight (for example, a typographical error in transposing two numbers in a phone number) or substantial (for example, using a difference phone number).

In analyzing credit application data elements or attributes, the system generates an early life account score at block 212. At block 214, the system determines whether to generate an alert based on the early life account score that was generated at block 212. The system can also generate an alert trigger based on consumer preferences (which are discussed in further detail below). In some embodiments, the system generates an alert trigger based on the analysis of the credit applications performed at block 210 without generating an early life account score. At block 216, the system generates and/or sends a trigger alert with an early life account score and/or the application data element or attribute that triggered the alert.

Development Process

Figure 3:
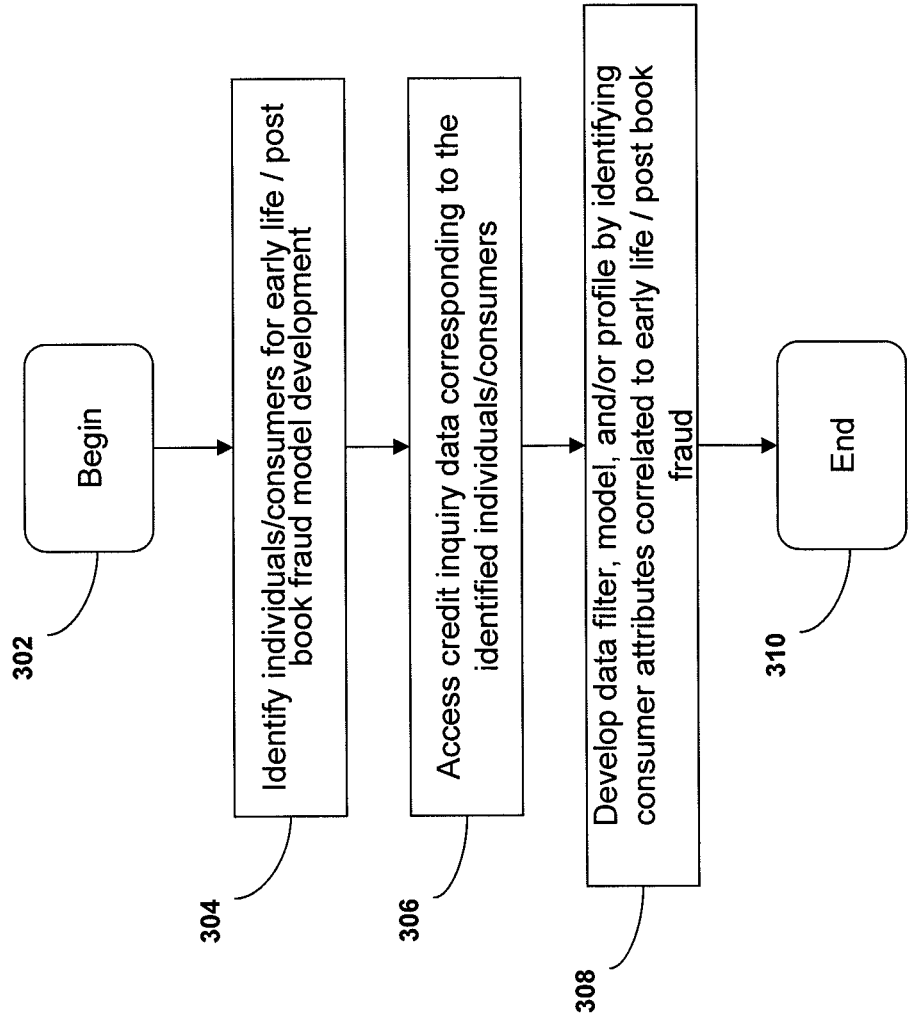
FIG. 3 is a flow chart depicting an embodiment of a process for developing a data filter, model, and/or profile by identifying attributes correlated to early life post book fraud.

FIG. 3 is a flow chart depicting an embodiment of a process for developing a data filter or model for detecting early life/post book fraud. In some embodiments, the data filter is developed by identifying consumer attributes and/or credit application data elements or attributes that are correlated to credit accounts that exhibit early life/post book fraud and/or identity fraud characteristics. Data filters include without limitation models, profiles, or the like that can be applied to data for generating an output. The process begins at block 302, and proceeds to block 304 where the system identifies individuals, consumers, and/or other entities for early life/post book fraud model development. At block 306 the process accesses credit inquiry and other data corresponding to the identified entities. At block 308, the process develops a data filter by identifying consumer attributes or credit application attributes correlated to early life/post book fraud, and proceeds to an end state at block 310.

Application Process

Figure 4A:
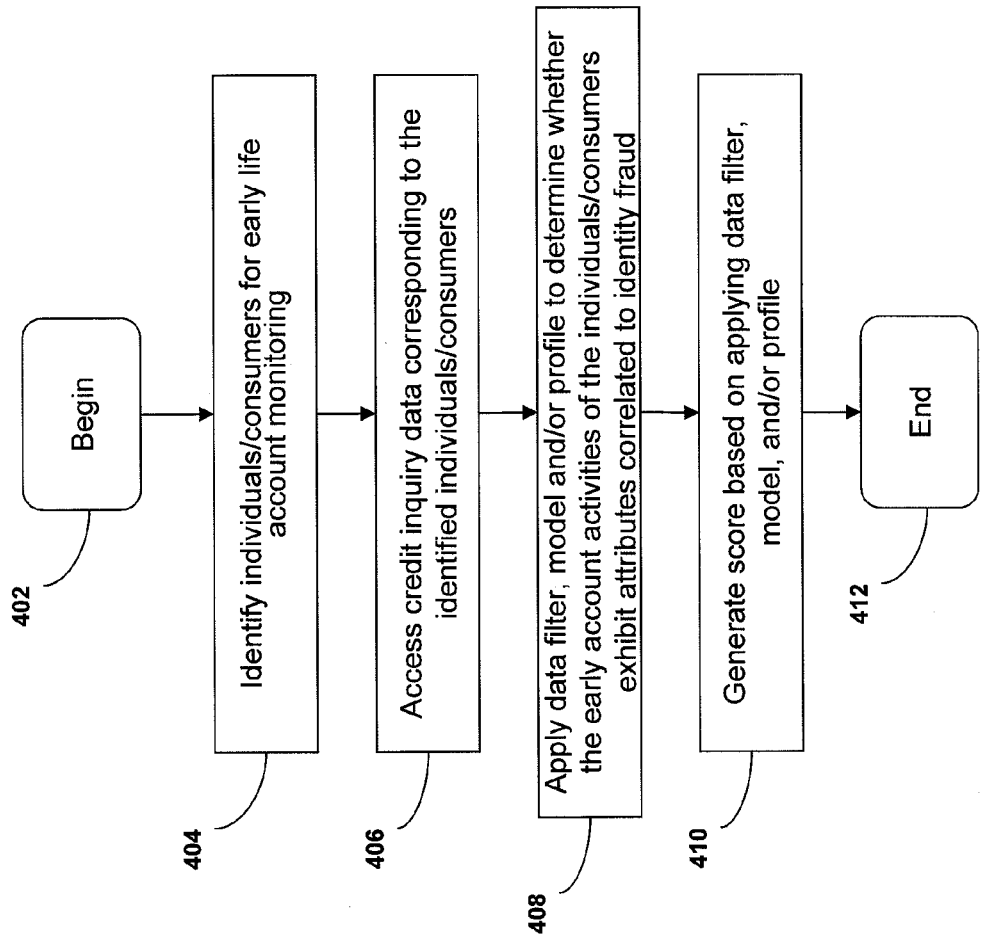
FIG. 4A is a flow chart depicting an embodiment of a process for applying a data filter, model, and/or profile to identify accounts exhibiting early life/post book fraud.

FIG. 4A is a flow chart depicting an embodiment of a process for applying a data filter to determine whether the early account activities of individuals, consumers, and/or entities exhibit attributes correlated to identity fraud and/or early life/post book fraud. The process begins at block 402, and proceeds to block 404 where the process identifies individuals, consumers, and/or entities for early life account monitoring (for example, obtained via a data file from a client). At block 406, the process accesses credit inquiry and other data corresponding to the identified entities. At block 408, the process applies a data filter to determine whether the early account activities of an entity are exhibiting attributes or characteristics related to identify fraud and/or early life/post book fraud. At block 410, the process generates a score based on applying the data filter, and proceeds to an end state at block 412.

Figure 4B:
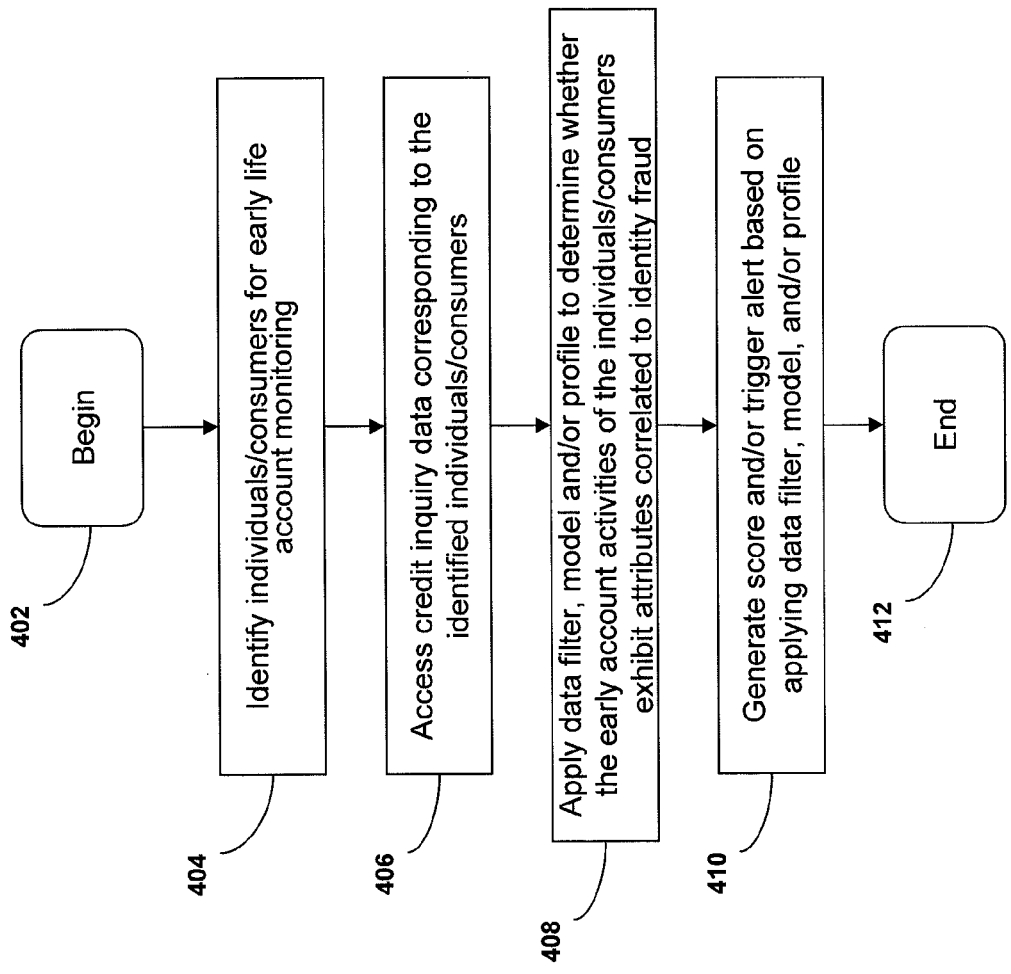
FIG. 4B is a flow chart depicting an embodiment of a process for applying a data filter, model, and/or profile to identify accounts exhibit early life/post book fraud.
Figure 5:
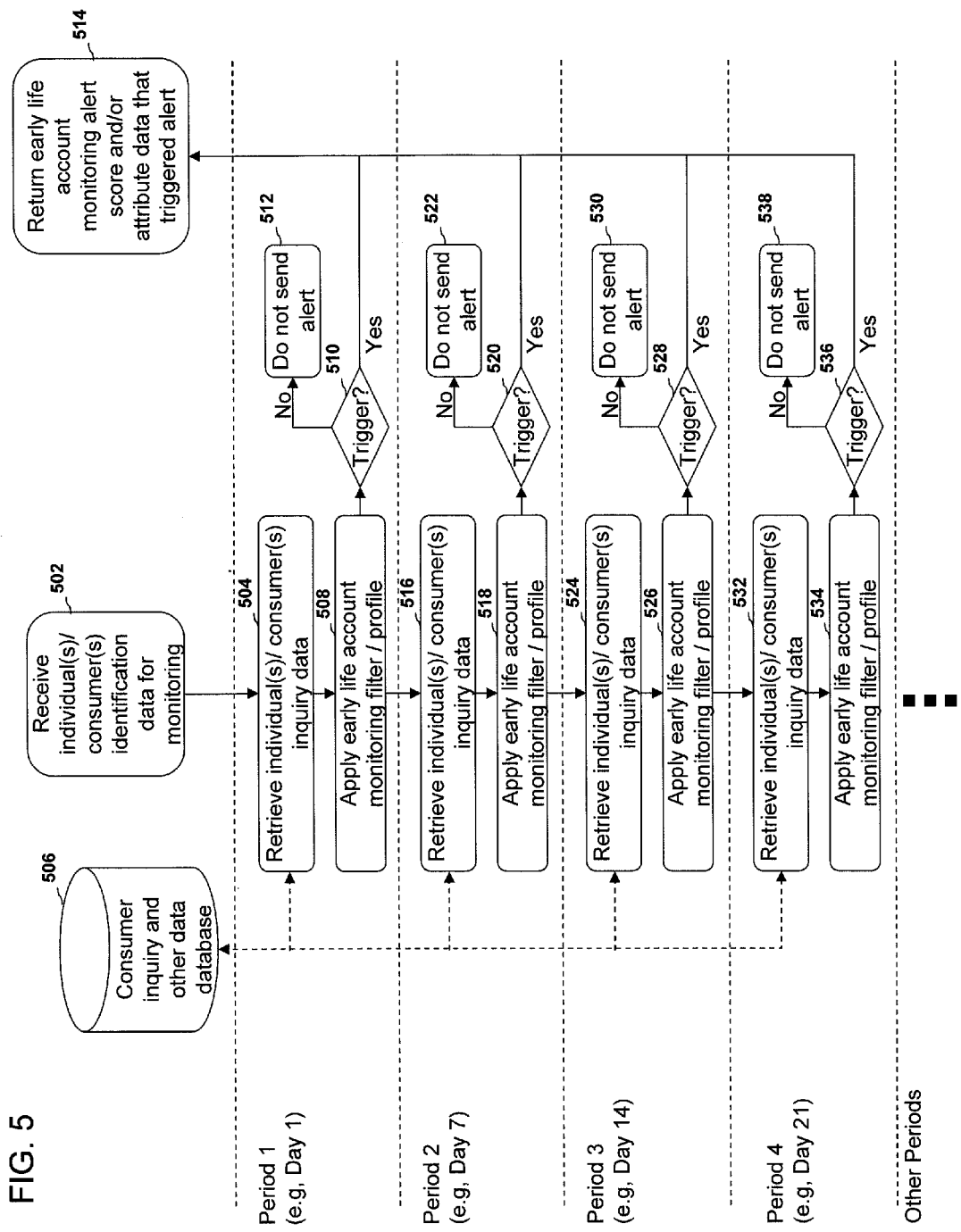
FIG. 5 is a flow chart depicting an embodiment of a more detailed process for identifying accounts exhibit early life/post book fraud.

FIG. 4B is a flow chart depicting an embodiment of another process to perform early detection of identity fraud and/or early life/post book fraud. At block 402, the process begins, and proceeds to block 404 where the process identifies entities and/or credit accounts for early life account monitoring. The identified entities and/or credit accounts for early life account monitoring are provided by a financial service provider via a data file or the like stored a computer readable medium or transferred via a network connection. The process performs early life account monitoring on the entities that are identified in the data file. At block 406, the process accesses credit inquiry and other data corresponding to the identified entities. The process accesses a consumer inquiry and other data database 110 to access credit inquiry and other data corresponding to the identified entities. At block 408, the process applies a data filter to determine whether the early account activities of the entity exhibit attributes correlated to identity fraud and/or early life/post book fraud. In some embodiments, the process applies more than one data filter to determine whether the early account activities of the individual consumers exhibit attributes correlated to identity fraud and/or early life/post book fraud. The process can apply data filters over a period of time as illustrated in FIG. 5. At block 410, the process generates a score and/or triggers an alert based on applying the data filter, and proceeds to an end state at block 412.

Identifying Accounts

FIG. 5 is a flow chart illustrating an embodiment of a process wherein an early life account monitoring filter and/or profile is applied to inquiry and other data associated with an individual(s) or consumer(s) over a period of time. As illustrated in FIG. 5, the early life account monitoring filter is applied over a number of periods. For example, the early life account monitoring filter or model may be applied over one period, two periods, three periods, four periods, or more, and each time period may correspond to any number of days. In addition, a period may be one day, two days, three days, four days, five days, six days, seven days, fourteen days, three months, or the like.

In the embodiment illustrated in FIG. 5, each period is seven days long, wherein period 2 is day 7, period 3 is day 14, and period 4 is day 21. The process begins at block 502 with the system receiving an individual(s) and/or consumer(s) identification data for monitoring. Such consumer identification data may be received in an electronic data file from a financial service provider. At block 504, the process retrieves, obtains, and/or accesses individual inquiry and other data from consumer and inquiry other data database 506. At decision point 510, the process determines whether to generate a trigger based on the application of the early life account monitoring filter. The process outputs an early life account score based on the application of the filter to the individual's inquiry and other data. If the early life account score does not exceed a certain threshold level, then no trigger is generated. Accordingly, the process does not send an alert as illustrated in block 512. Alternatively, if the early life account score is above a trigger level at decision block 510, then the process returns an early life account monitoring alert score and/or attribute data that triggered the alert at block 514.

At block 516, the process retrieves the individual's inquiry and other data from consumer inquiry and other data database 506. The retrieval of the individual's inquiry and other data may include new data because block 516 occurs during period two (for example, day 7). The new consumer inquiry and other data includes new applications for credit accounts or the like. At block 518, the process applies an early life account monitoring filter to the acquired inquiry and other data associated with the individual, and the process can generate an early life account score. At decision block 520, if the early life account score is below a certain threshold, then the process does not send an alert at block 522. If the early life account score is above a certain threshold at decision block 520, then the process returns the early life account monitoring alert score and/or the attribute data that triggered the alert.

At block 524, the process retrieves the individual's inquiry and other data by accessing consumer inquiry and other data database 506. Consumer inquiry and other data database 506 can include new inquiry and other data for the individual because block 524 occurs at period 3 (for example, day 14). At block 526, the process applies the early life account monitoring filter to the inquiry and other data that was retrieved for the individual, and the process can output a new early life account score based on the application of the filter on the new data. At decision block 528, the process determines whether the new early life account score is below a threshold level. If the early life account score is below a threshold level the process does not send an alert at block 530. If the early life account is above a certain threshold level at decision block 528, the process returns the early life account monitoring alert score and/or the attribute data that triggered the alert.

At block 532, the process retrieves the individual's inquiry and other data database by accessing consumer inquiry and other data database 506. New inquiry and other data may exist within consumer inquiry and other data database 506 because block 532 occurs in period 4 (for example, day 21). At block 534, the process applies the early life account monitoring filter to the inquiry and other data for the individual to generate a new early life account score. At decision block 536, the process determines whether the early life account score is below a certain threshold level. At block 538, if the early life account score is below a certain threshold level the process does not send an alert. If the earlier life account score is above a certain threshold level at decision block 536, then the process returns the early life account monitoring alert score and/or the attribute data that triggered the alert at block 514.

The process in FIG. 5 repeats the process for additional periods beyond period 4. In other embodiments, the process can operate over fewer periods. Although not illustrated in FIG. 5, the process applies the same early life account monitoring filter for each period or alternatively, the process applies a different early life account monitoring filter for each period.

Figure 6:
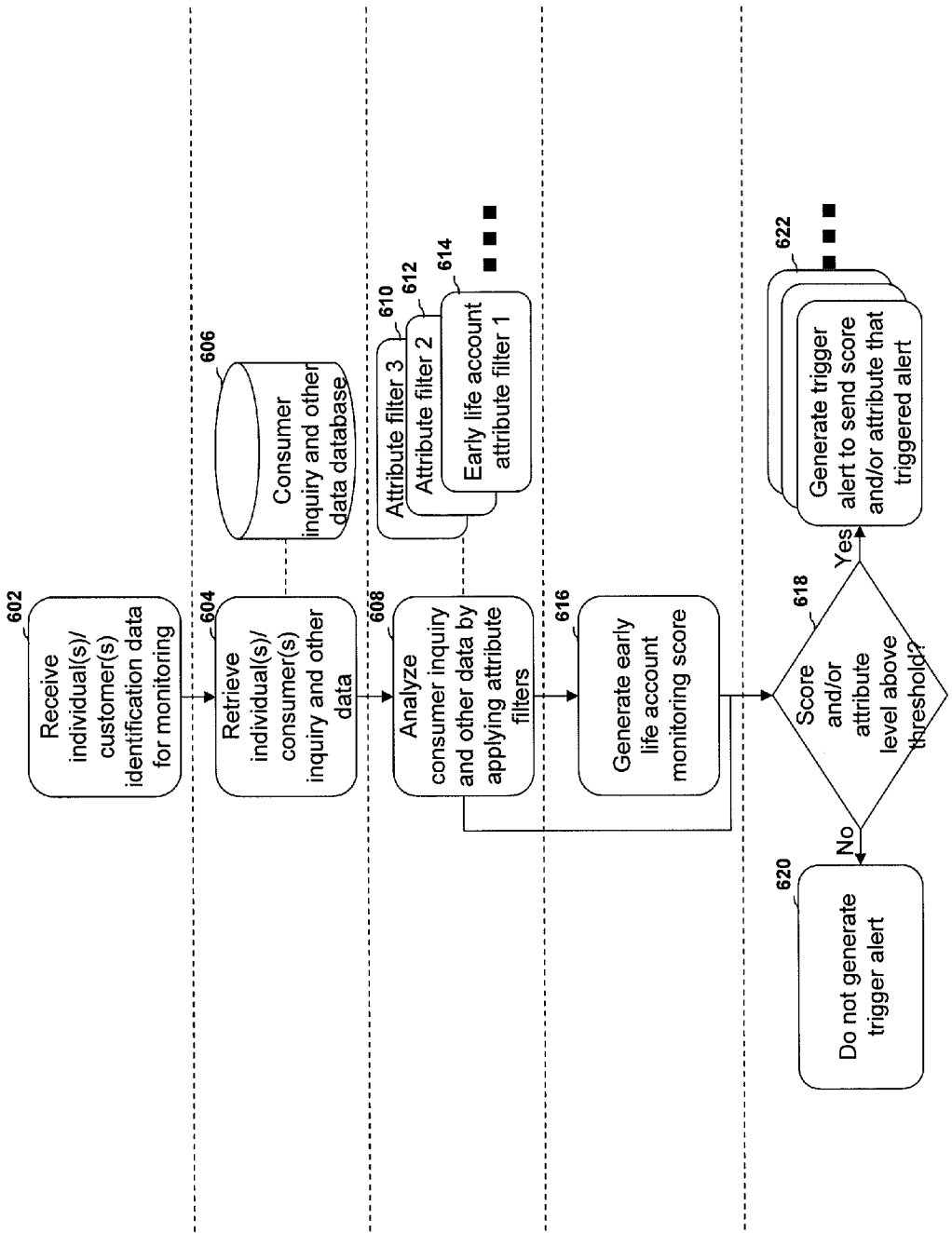
FIG. 6 is a flow chart depicting an embodiment of a more detailed process for applying an early life account monitoring filter and/or profile.

FIG. 6 is a flow chart illustrating an embodiment of a method for applying the early life account monitoring filter as illustrated in FIG. 5. The process begins at block 602 with the process receiving individual(s) and/or customer(s) identification data for monitoring. The identification data for individuals to be monitored is received from a financial service provider, and the identification data may be received in an electronic data file. At block 604, the process retrieves inquiry and other data for the identified individuals. The inquiry and other data is accessed and/or obtained from consumer inquiry other data database 606. At block 608, the process analyzes the inquiry and other data by applying attribute filters.

The process obtains or accesses one or more attribute filters 610, 612, 614. The process determines (dynamically or predetermined) which attribute filter to use based on a time period in which the analysis occurs. In some embodiments, the attribute filter selected by the process for the analysis is based on the preference of the financial service provider. For example, attribute filters are selected based on a client's preference on pricing as determined by the financial service provider. Alternatively, the process selects an attribute filter based on a client's timing preferences. For example, some clients prefer that alerts be sent quickly or as soon as possible, thereby requiring an attribute filter that requires less processing time.

At block 616, the process generates an early life account monitoring score based on application or analysis of the inquiry data. At decision block 618, the process determines whether the early life account monitoring score is above a certain threshold level. If the score is below a certain threshold level the process does not generate a trigger alert at block 620. If the early life account monitoring score is above a certain threshold level at decision block 618, then the process generates a trigger alert to send the score and/or the attribute that triggered the alert at block 622. Alternatively, the process does not to generate an early life account monitoring score. When a score is not generated by the process, the process determines whether an attribute is above a certain threshold level at decision block 618. For example, at block 608 the process determines whether the number of credit account applications filed by an applicant exceeds a certain threshold for a period of time. If the number of applications does not exceed at threshold level, then the process does not generate a trigger alert at block 620. If the number of applications exceeds a threshold level, then the process at decision block 618 generates a trigger alert to send the attribute that triggered the alert at block 622.

FIGS. 7A-7D are flow charts illustrating embodiments of methods for linking inquiry data to a consumer based on a single identity data element of the consumer. As illustrated, a consumer can comprise consumer data having identity data elements, for example name, address, telephone number, and social security number. By linking inquiry data based on a single identity data element, as opposed to linking only if all or substantially all the identity data elements match the consumer, the system can analyze additional inquiry data to detect possible fraud across a larger number of accounts.

Figure 7A:
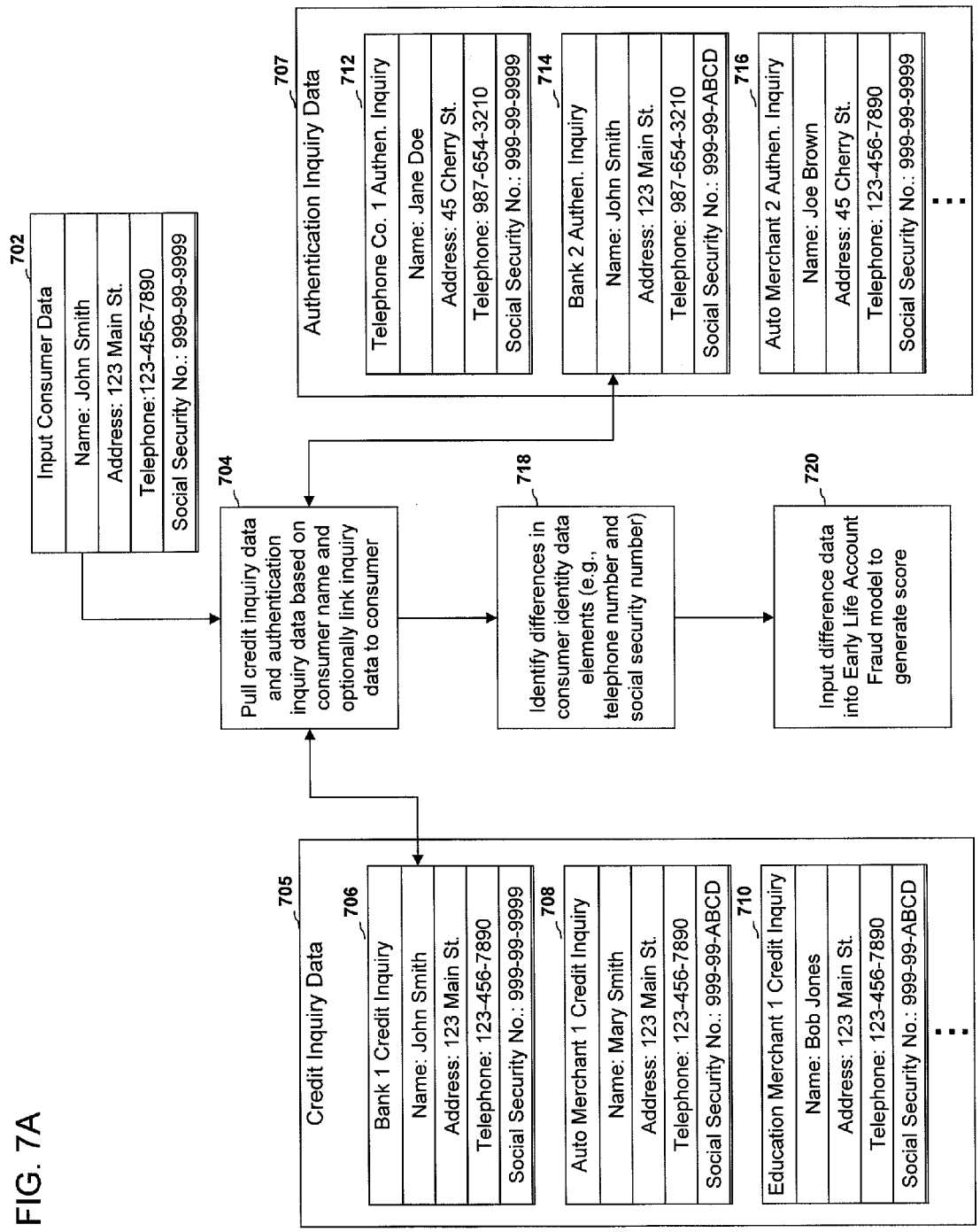
FIG. 7A-7D illustrates an embodiment of processes for pulling inquiry data based on identity data elements to generate an early life account score.

In FIG. 7A, an early life account fraud system is configured to receive the identity data elements of a consumer at block 702. At block 704, the system is configured to pull credit inquiry data from the data store is configured to pull the inquiry data based on a single identity data element of the consumer. As illustrated in 7A, the system is configured to pull inquiry data based on the consumer's name. In this example, the system pulls the bank 1 credit inquiry data 706 and bank 2 authentication inquiry data 714. At block 718, the system compares the other identity data elements to the remaining identity data elements in the inquiry data 706 and the authentication inquiry data 714. In this example, the remaining identity data elements of the inquiry data 706 match the other identity data elements of the consumer. In contrast, the telephone number and the social security number of the authentication inquiry data 714 differs from the telephone number and the social security number of the consumer. The system at block 720 is configured to input this difference data into an early life account fraud model to generate an early life account fraud score.

Figure 7B:
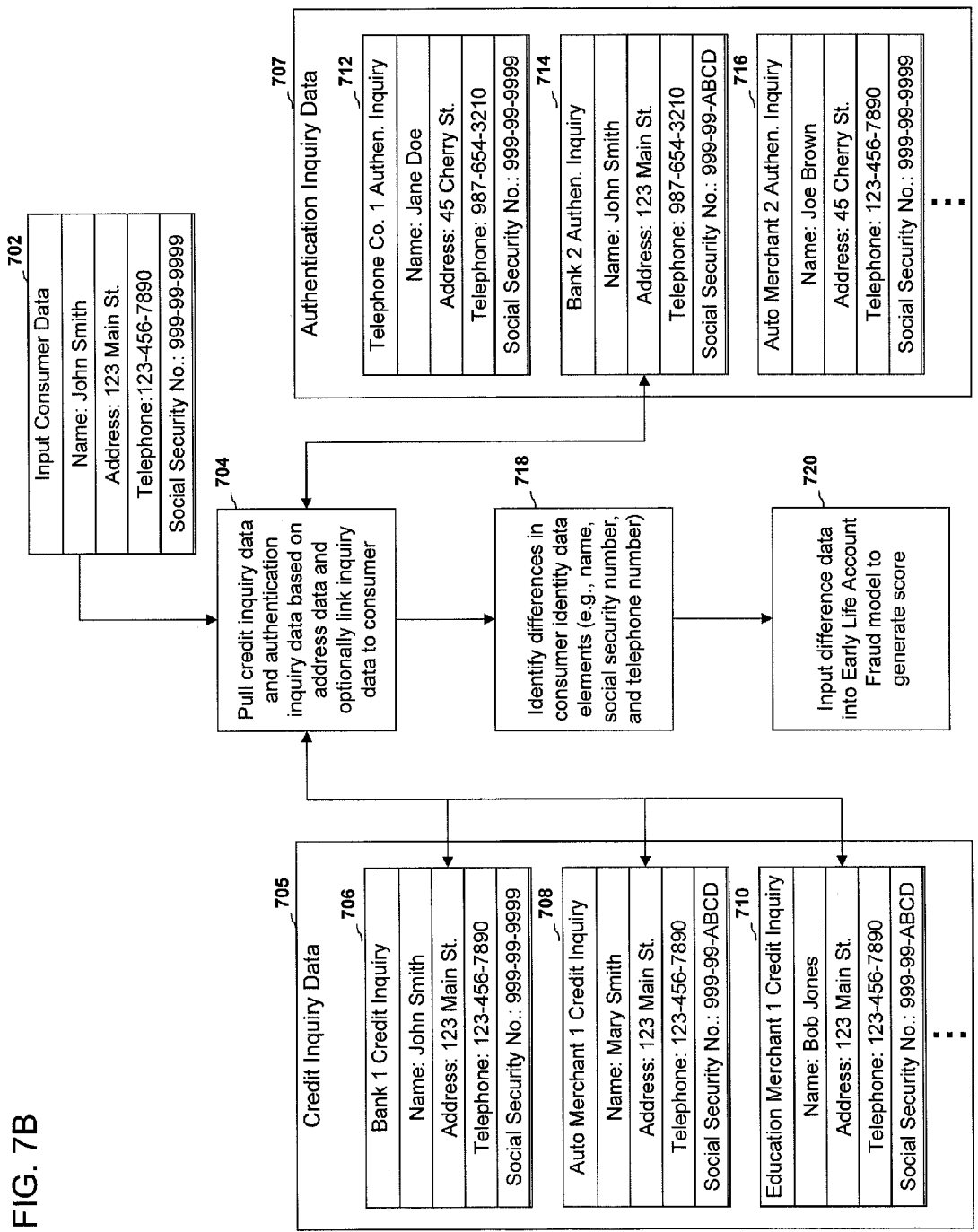

FIG. 7B is a flow chart illustrating the system pulling credit inquiry data and authentication inquiry data based on the address information of the consumer. In this example, the system pulls the bank 1 credit inquiry data 706, the auto merchant 1 credit inquiry data 708, the education merchant 1 credit inquiry data 710, and the bank 2 authentication inquiry data 714. In each of the pulled inquiry data, the address identity data element was the same as the address of the consumer. At block 718, the system is configured to identify differences in the other identity data elements. For example, the name element in the inquiry data 708 is designated as Mary Smith whereas the name of the consumer is John Smith. Additionally, the social security number for inquiry data 708 is different from that of the social security number for the consumer. For inquiry data 710, the name element as well as the social security number element are different from the name and social security number of the consumer. For inquiry data 714, the telephone number and the social security number are different from that of the consumer. At block 720 the system is configured to input these differences into an early life account fraud model to generate a score.

Figure 7C:
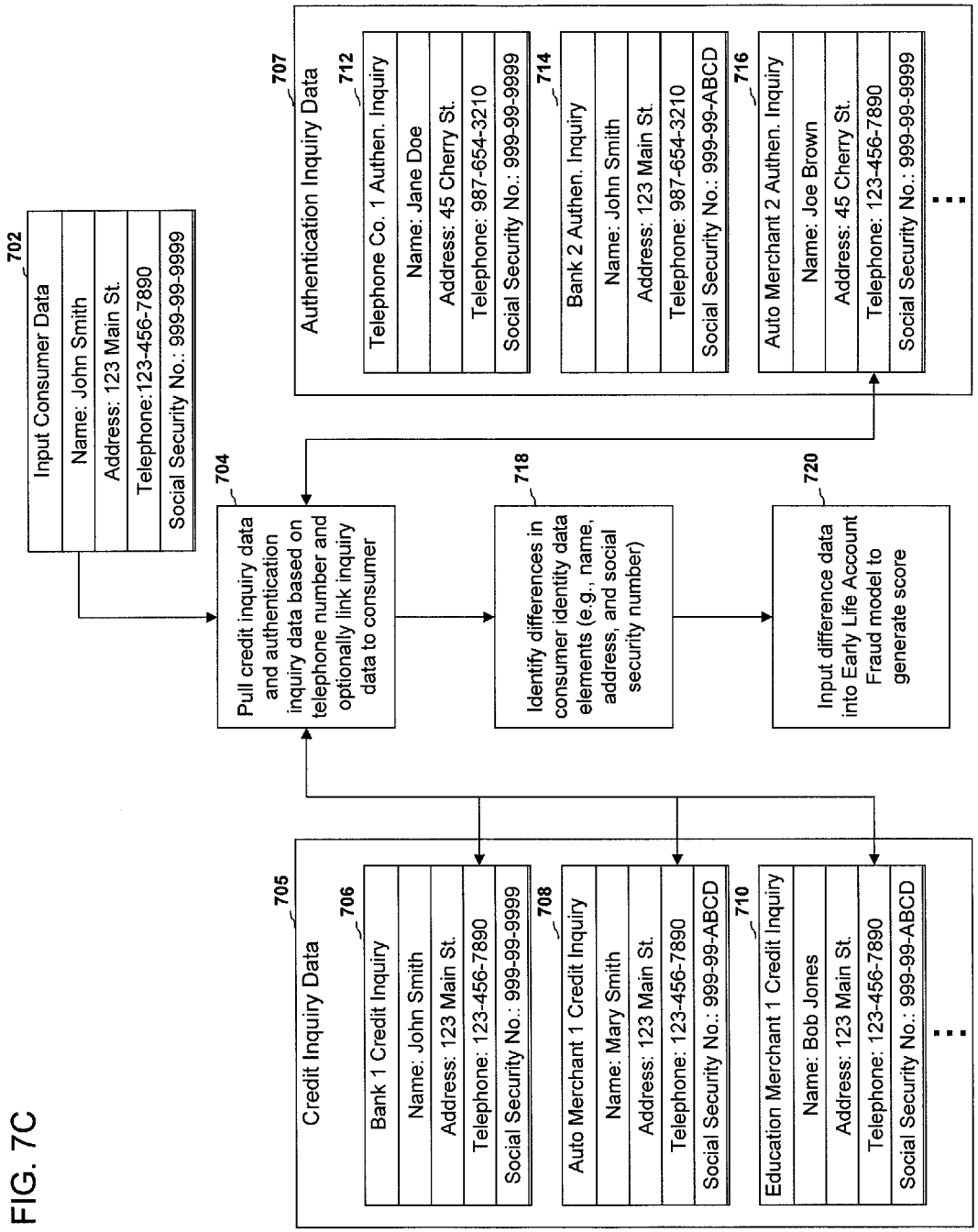

In FIG. 7C, the system is configured to pull inquiry data based on telephone number. As illustrated in FIGS. 7A and 7B, FIG. 7C illustrates that not all of the inquiry data elements are pulled because some of the inquiry data comprise telephone numbers that are different from that of the consumer. Specifically, authentication inquiry data 712 and authentication inquiry data 714 have telephone numbers that are different from that of the consumer. At block 718, the system is configured to identify differences in the other identity data elements and input those differences into the early life account fraud model at block 720 to generate a score.

Figure 7D:
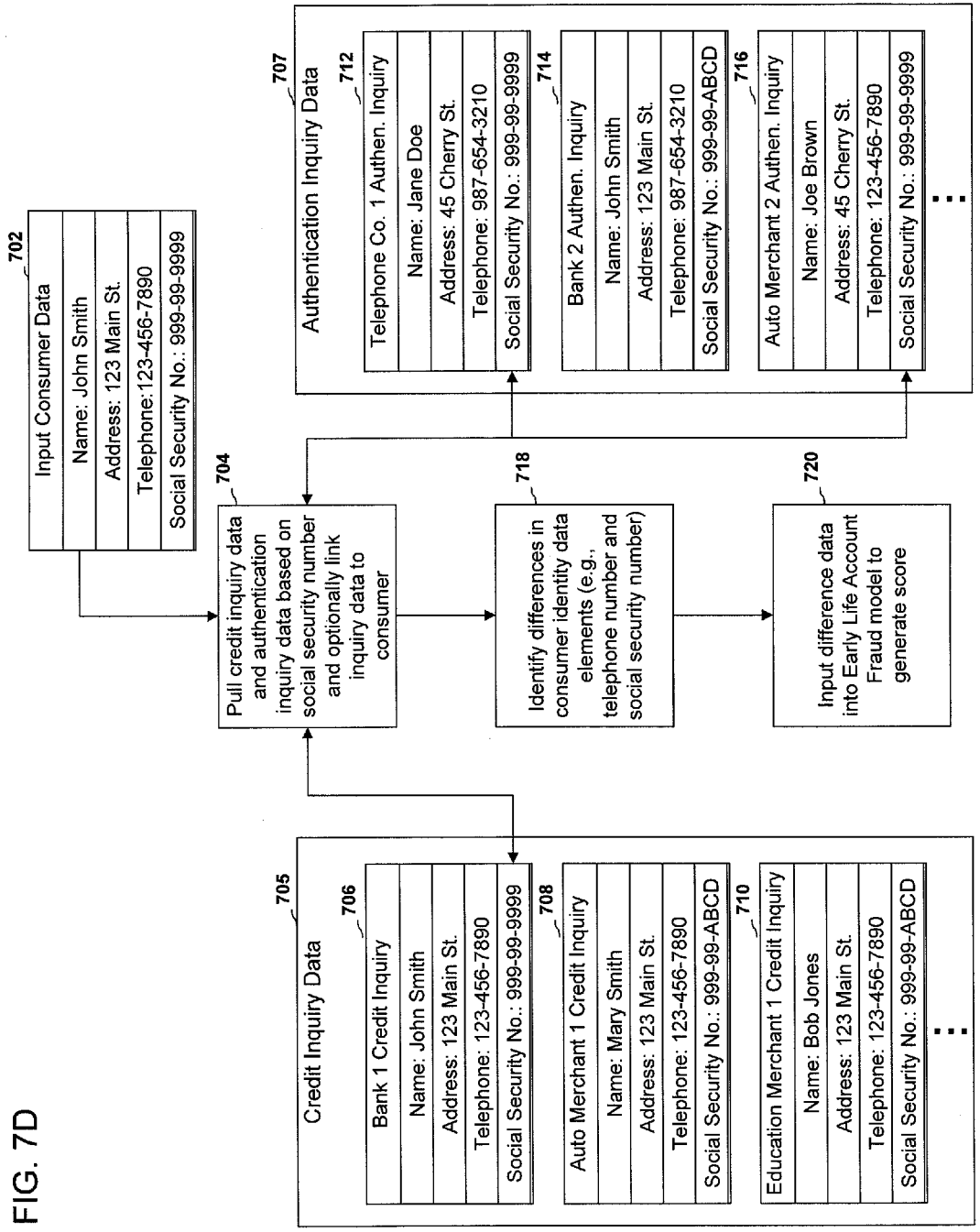

In FIG. 7D, the system is configured to pull inquiry data based on social security number. At block 718, the system identifies the other identity data elements that differ from that of the consumer, and inputs this different data into an early life account fraud model to generate a score at block 720. The system can be configured to perform one or more of the foregoing identity data element analyses in order to generate an early life account fraud score.

Figure 8:
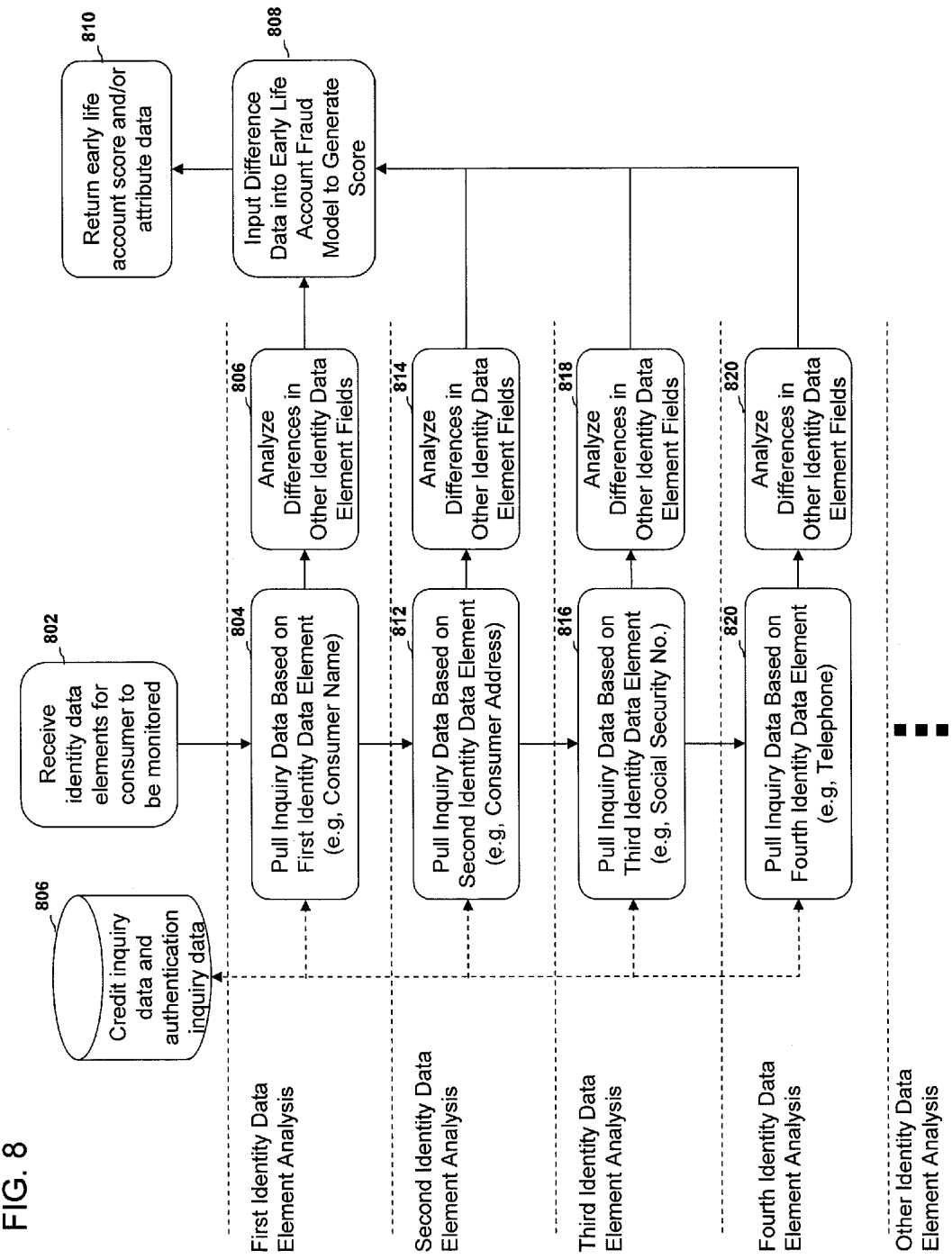
FIG. 8 is a flow chart depicting an embodiment of a more detailed process for identifying consumers that exhibit early life account fraud.

FIG. 8 is a flow chart illustrating one embodiment of how the system can be configured to perform at least all four of the foregoing identity data element analyses to generate an early life account monitoring score. At block 802, the system receives identity data elements for a consumer to be monitored using the early life account fraud model. At block 804, the system pulls inquiry data from the database 806 based on the first identity data element of the consumer, for example, the name of the consumer. At block 806, the system analyzes the differences in the other identity data elements and inputs those differences into an early life account fraud model at block 808. At block 812, the system can pull inquiry data from the database 806 based on the second identity data element, for example, the address of the consumer. At block 814, the system analyzes the differences in the other identity data elements and inputs this difference data into an early life account fraud model at block 808. At block 816, the system pulls inquiry data from the database 806 based on a third identity data element, for example, the social security number of the consumer. At block 818, the system analyzes the differences in the other identity data elements and inputs this difference data into the early life account fraud model at block 808. At block 820, the system pulls inquiry data from the database 806 based on a fourth identity data element, for example, telephone number. At block 20, the system analyzes the differences in the other identity data elements and inputs this difference data into the early life account fraud model at block 808.

At block 808, the system can be configured to generate a fraud score for the analysis performed for each identity data element. The system can combine the multiple fraud scores into a single early life account fraud score that is returned or outputted at block 810. Optionally, the system can be configured to apply waiting factors to the initially generated fraud scores before combining the scores into a single early life account fraud score.

Alternatively, the system at block 808 can be configured to analyze all the difference data inputted into the early life account fraud model in order to identify various attributes exhibited by the consumer. Based on these identified attributes, the system can be configured to analyze the attributes to generate a fraud score at block 808 which is then outputted at block 810. Optionally, the system can be configured to apply waiting factors to specific attributes that are highly correlated to predicting early life account fraud. After applying the waiting factors to the attributes, the system can be configured to generate a fraud score at block 808 and output the score at block 810.

Figure 9:
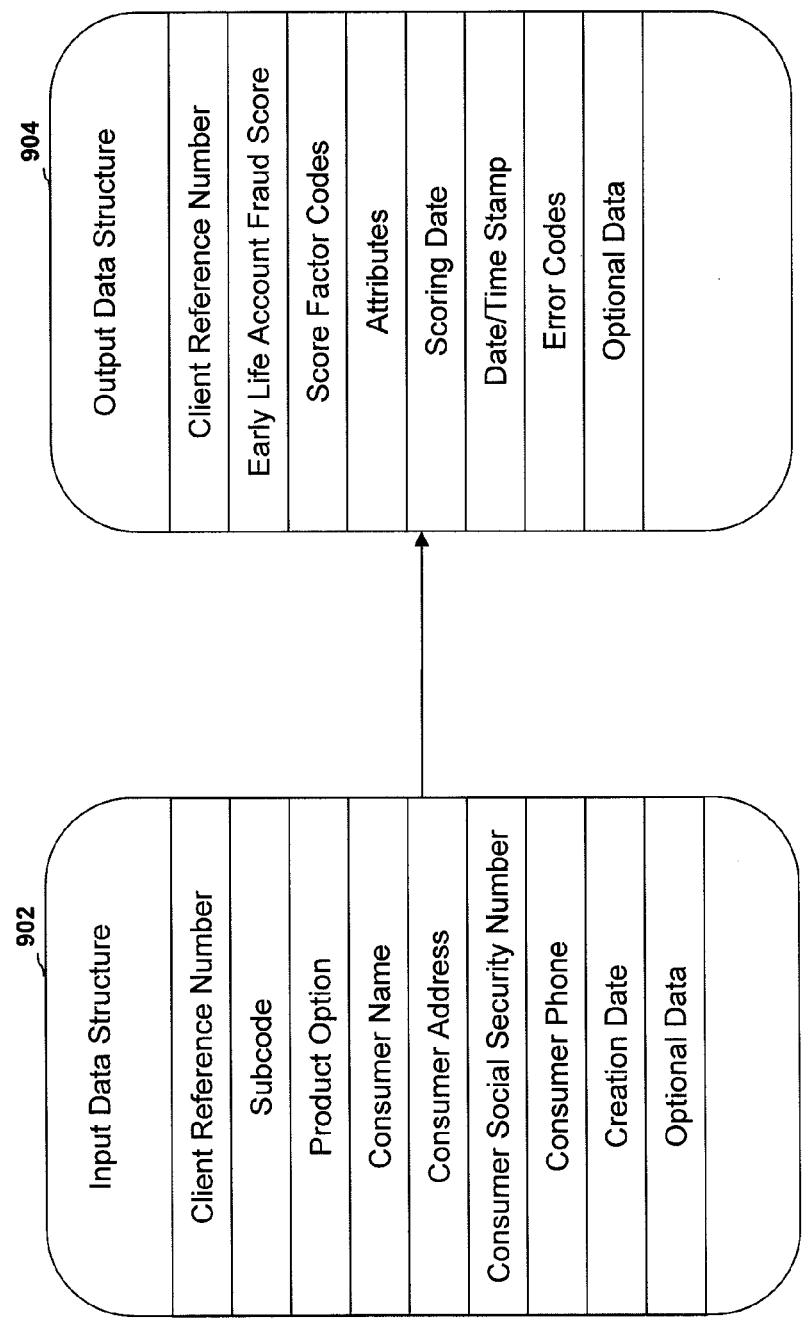
FIG. 9 illustrates an embodiment of an input data structure that is received by an early life account model, and an output data structure that is outputted by an early life account model.

FIG. 9 illustrates an embodiment of an input data structure as well as an output data structure. The input data structure 902 is generated by a financial service provider or other third party that wishes to monitor consumers for early life account fraud. As illustrated in FIG. 9, the input data structure 902 comprises identity data elements, for example, consumer name, consumer address, consumer social security number, and consumer phone number. Additionally, input data structure 902 comprises other data elements, such as, client reference number, sub code, product option, creation date, and other optional data. The system is configured to receive the input data structure 902 in real time or in a delayed batch file from the financial service provider or other third party. For each consumer account to be monitored, the financial service provider or third party provides each of the foregoing data elements for the consumers to be monitored.

The output data structure 904 comprises an early life account fraud score. Optionally, the output data structure 904 comprises one or more of a client reference number, score factor codes, attributes, scoring data, dates/time stamp, error codes, and other optional data. Factor codes are codes that provide reasons for or help explain why a consumer has been assigned a particular early life account fraud score. The system can be configured to generate the output data structure 904 in real time or as a batch file for the financial service provider or other third party to access. The system can be configured to generate each of the foregoing data elements for each of the consumers to be monitored for early life account fraud.

Computer System

Figure 10:
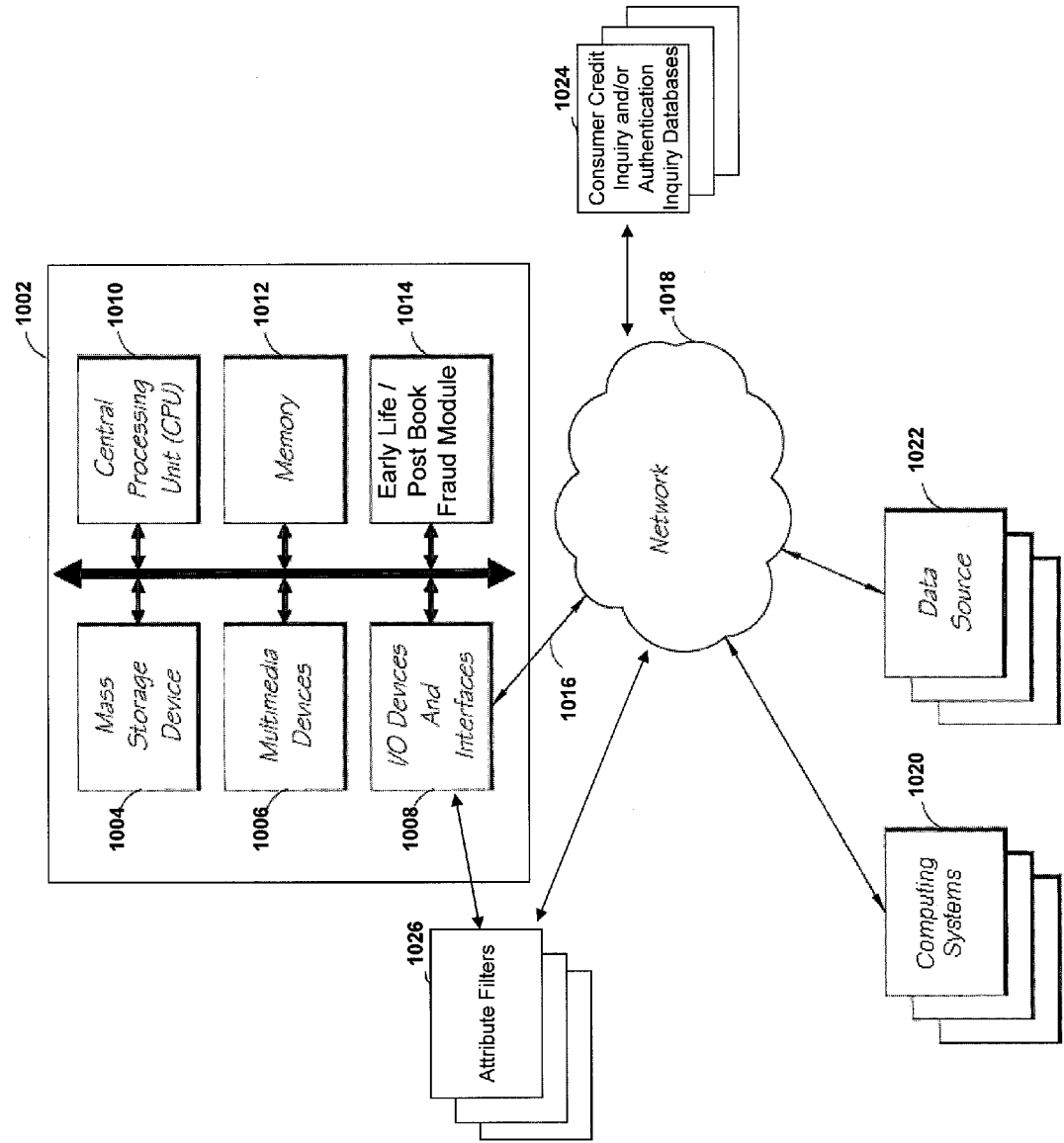
FIG. 10 is a block diagram depicting an embodiment of a computer hardware system configured to run software for implementing one or more embodiments of the early life/post book fraud modules and processes.

In some embodiments, the systems, processes, and methods described above are implemented using a computing system, such as the one shown in FIG. 10. The exemplary computer system 1002 is in communication with one or more computing systems 1020 and/or one or more data sources 1022 via one or more networks 1018. While FIG. 10 illustrates an embodiment of a computing system 1002, it is recognized that the functionality provided for in the components and modules of computer system 1002 may be combined into fewer components and modules, or further separated into additional components and modules.

Early Life/Post Book Fraud Module

The computer system 1002 includes an early life/post book fraud module 1014 that carries out the functions, methods, acts, and/or processes described herein. The early life/post book fraud module 1014 is executed on the computer system 1002 by a central processing unit 1010 discussed further below.

In general the word "module," as used herein, refers to logic embodied in hardware or firmware or to a collection of software instructions; having entry and exit points. Modules are written in a program language, such as JAVA, C or C++, or the like. Software modules may be compiled or linked into an executable program, installed in a dynamic link library, or may be written in an interpreted language such as BASIC letters, PERL, LUA, or Python. Software modules may be called from other modules or from themselves, and/or may be invoked in response to detected events or interruptions. Modules implemented in hardware include connected logic units such as gates and flip-flops, and/or may include programmable units, such as programmable gate arrays or processors.

Generally, the modules described herein refer to logical modules that may be combined with other modules or divided into sub-modules despite their physical organization or storage. The modules are executed by one or more computing systems, and may be stored on or within any suitable computer readable medium, or implemented in-whole or in-part within special designed hardware or firmware. Not all calculations, analysis, and/or optimization require the use of computer systems, though any of the above-described methods, calculations, processes, or analyses may be facilitated through the use of computers. Further, in some embodiments, process blocks described herein may be altered, rearranged, combined, and/or omitted.

Computing System Components

The computer system 1002 includes one or more processing units (CPU) 1010, which may include a microprocessor. The computer system 1002 further includes a memory 1012, such as random access memory (RAM) for temporary storage of information, a read only memory (ROM) for permanent storage of information, and a mass storage device 1004, such as a hard drive, diskette, or optical media storage device. Alternatively, the mass storage device may be implemented in an array of servers. Typically, the components of the computer system 1002 are connected to the computer using a standards based bus system. The bus system can be implemented using various protocols, such as Peripheral Component Interconnect (PCI), Micro Channel, SCSI, Industrial Standard Architecture (ISA) and Extended ISA (EISA) architectures.

The computer system 1002 includes one or more input/output (I/O) devices and interfaces 1008, such as a keyboard, mouse, touch pad, and printer. The I/O devices and interfaces 1008 can include one or more display devices, such as a monitor, that allows the visual presentation of data to a user. More particularly, a display device provides for the presentation of GUIs as application software data, and multi-media presentations, for example. The I/O devices and interfaces 1008 can also provide a communications interface to various external devices. The computer system 1002 may include one or more multi-media devices 1006, such as speakers, video cards, graphics accelerators, and microphones, for example.

Computing System Device/Operating System

The computer system 1002 may run on a variety of computing devices, such as a server, a Windows server, and Structure Query Language server, a Unix Server, a personal computer, a laptop computer, and so forth. In other embodiments, the computer system 1002 may run on a mainframe computer suitable for controlling and/or communicating with large databases, performing high volume transaction processing, and generating reports from large databases. The computing system 1002 is generally controlled and coordinated by an operating system software, such as z/OS, Windows 95, Windows 98, Windows NT, Windows 2000, Windows XP, Windows Vista, Windows 7, Lenox, BSD, SunOS, Solaris, or other compatible operating systems, including proprietary operating systems. Operating systems control and schedule computer processes for execution, perform memory management, provide file system, networking, and I/O services, and provide a user interface, such as a graphical user interface (GUI), among other things.

Network

The computer system 1002 illustrated in FIG. 10 is coupled to a network 1018, such as a LAN, WAN, or the Internet via a communication link 1016 (wired, wireless, or a combination thereof). Network 1018 communicates with various computing devices and/or other electronic devices. Network 1018 is communicating with one or more computing systems 1020 and one or more data sources 1022. The early life/post book fraud module 1014 may access or may be accessed by computing systems 1020 and/or data sources 1022 through a web-enabled user access point. Connections may be a direct physical connection, a virtual connection, and other connection type. The web-enabled user access point may include a browser module that uses text, graphics, audio, video, and other media to present data and to allow interaction with data via the network 1018.

The browser module or other output module may be implemented as a combination of an all-points addressable display such as a cathode ray tube (CRT), a liquid crystal display (LCD), a plasma display, or other types and/or combinations of displays. The output module may be implemented to communicate with input devices 1008 and they also include software with the appropriate interfaces which allow a user to access data through the use of stylized screen elements, such as menus, windows, dialogue boxes, tool bars, and controls (e.g., radio buttons, check boxes, sliding scales, and so forth). Furthermore, the output module may communicate with a set of input and output devices to receive signals from the user.

Other Systems

The computing system 1002 may include one or more internal and/or external data sources (e.g., data sources 1022). In some embodiments, one or more of the data repositories and the data sources described above may be implemented using a relational database, such as DB2, Sybase, Oracle, CodeBase, and Microsoft® SQL Server as well as other types of databases such as a flat-file database, an entity relationship database, and object-oriented database, and/or a record-based database.

The computer system 1002 as shown in FIG. 10 accesses one or more attribute filters 1026. The attribute filters 1026 may be stored in a database or data repository. The computer system 1002 may access the one or more attribute filters 1026 through a network 1018 or may directly access the database or data repository through I/O devices and interfaces 1008. The data repository storing the one or more attribute filters may reside within the computer system 1002.

The computer system 1002 also accesses one or more consumer verification databases 1024. The consumer verification databases 1024 may be stored in a database or data repository. The computer system 1002 may access the one or more consumer verification databases 1024 through a network 1018 or may directly access the database or data repository through I/O devices and interfaces 1008. The data repository storing the one or more consumer verification databases 1024 may reside within the computer system 1002.

Additional Embodiments

Although this invention has been disclosed in the context of certain preferred embodiments and examples, it will be understood by those skilled in the art that the present invention extends beyond the specifically disclosed embodiments to other alternative embodiments and/or uses of the invention and obvious modifications and equivalents thereof. Additionally, the skilled artisan will recognize that any of the above-described methods may be carried out using any appropriate apparatus. Further, the disclosure herein of any particular feature, aspect, method, property, characteristic, quality, attribute, element, or the like in connection with an embodiment may be used in all other embodiments set forth herein. Thus, it is intended that the scope of the present invention herein disclosed should not be limited by the particular disclosed embodiments described above.

Conditional language, such as, among others, "may," "could," "might," or "may," unless specifically stated otherwise, or otherwise understood within the context as used, is generally intended to convey that certain embodiments include while other embodiments do not include, certain features, elements and/or blocks. Thus, such conditional language is not generally intended to imply that features, elements and/or blocks are in any way required for one or more embodiments or that one or more embodiments necessarily include logic for deciding, with or without user input or prompting, whether these features, elements and/or steps are included or are to be performed in any particular embodiment.

What is claimed is:

1. A computer-implemented method for fraud monitoring, the computer-implemented method comprising:
   accessing consumer data related to a consumer, the consumer data comprising a first identity data element, a second identity data element, and a third identity data element;
   receiving, by the computer processor, a set of credit inquiry records, wherein the set of credit inquiry records comprises requests received from third parties for credit bureau data for the consumer within a predetermined time period, each of the credit inquiry records of the subset comprising a first identity data element, a second identity data element and a third identity data element;
   associating the consumer with at least one of the records of the credit inquiry records based on the first identity data element of the consumer being the same or similar to the first identity data element of the at least one credit inquiry record;
   for the credit inquiry records associated with the consumer,
      comparing the second identity data element of the consumer to each of the second identity data elements of the associated credit inquiry records;
      comparing the third identity data element of the consumer to each of the third identity data elements of the associated credit inquiry records;
   calculating a first set of attributes for the consumer based on the comparisons of the second identity data elements and the third identity data elements, wherein the first set of attributes includes one or more of:
      number of times the same or similar first identity data element is used with a different second identity data element,
      number of times the same or similar first identity element is used with a different third identity data element,
      number of times the same or similar second identity data element with a different third identity data element,
      number of times the same or similar third identity data element with a different second identity data element,
      number of different second data elements in a given time period, or
      number of different third data elements in a given time period;
   applying by the computer processor a fraud model using the first set of calculated attributes to predict a likelihood of fraud;
   generating by the computer processor a first fraud score based on the applying the fraud model using the first set of calculated attributes;
   associating the consumer with at least one of the records of the credit inquiry records based on the second identity data element of the consumer being the same or similar to the second identity data element of the at least one credit inquiry record;
   for the credit inquiry records associated with the consumer,
      comparing the first identity data element of the consumer to each of the first identity data elements of the associated credit inquiry records;
      comparing the third identity data element of the consumer to each of the third identity data elements of the associated credit inquiry records;
   calculating a second set of attributes for the consumer based on the comparisons of the first identity data elements and the third identity data elements, wherein the second set of attributes includes one or more of:
      number of times the same or similar first identity element is used with a different third identity data element,
      number of times the same or similar second identity data element is used with a different first identity data element,
      number of times the same or similar second identity data element with a different third identity data element,
      number of times the same or similar third identity data element is used with a different first identity data element,
      number of different first identity data elements in a given time period,
      number of different third data elements in a given time period;
   applying by the computer processor a fraud model using the second set of calculated attributes to predict a likelihood of fraud;
   generating by the computer processor a second fraud score based on the applying the fraud model using the second set of calculated attributes; and
   calculating an overall fraud score using the first fraud score and the second fraud score;
   outputting the overall fraud score for the consumer.

2. The computer-implemented method for fraud monitoring of claim 1, wherein each of the first, second and third identity data elements comprises one of a name of the consumer, a social security number of the consumer, a telephone number of the consumer, or an address of the consumer.

3. The computer-implemented method for fraud monitoring of claim 1, wherein calculating the overall fraud score further comprises using a number of credit inquiry records associated with the consumer.

4. The computer-implemented method of claim 1, further comprising:

receiving, by the computer processor, a set of authentication inquiry records, wherein the set of authentication inquiry records comprises inquiries received from third parties to a credit bureau received within a predetermined time period, and wherein each inquiry is a request to verify and/or authenticate an identity or identification information of the consumer, each of the authentication inquiry records of the subset comprising a first identity data element, a second identity data element and a third identity data element;

associating the consumer with at least one of the records of the authentication inquiry records based on the first identity data element of the consumer being the same or similar to the first identity data element of the at least one authentication inquiry record;

for the authentication inquiry records associated with the consumer, comparing the second identity data element of the consumer to each of the second identity data elements of the associated authentication inquiry records;

comparing the third identity data element of the consumer to each of the third identity data elements of the associated authentication inquiry records;

calculating the first set of attributes for the consumer based on the comparisons of the second identity data elements and the third identity data elements, wherein the first set of attributes includes one or more of:

number of times the same or similar first identity data element is used with a different second identity data element, number of times the same or similar first identity element is used with a different third identity data element, number of times the same or similar second identity data element with a different third identity data element, number of times the same or similar third identity data element with a different second identity data element, number of different second data elements in a given time period, or number of different third data elements in a given time period;

applying by the computer processor the fraud model using the third set of calculated attributes to predict a likelihood of fraud;

generating by the computer processor the first fraud score based on the applying the fraud model using the first set of calculated attributes;

associating the consumer with at least one of the records of the authentication inquiry records based on the second identity data element of the consumer being the same or similar to the second identity data element of the at least one authentication inquiry record;

for the authentication inquiry records associated with the consumer, comparing the first identity data element of the consumer to each of the first identity data elements of the associated authentication inquiry records;

comparing the third identity data element of the consumer to each of the third identity data elements of the associated authentication inquiry records;

calculating the second set of attributes for the consumer based on the comparisons of the first identity data elements and the third identity data elements, wherein the second set of attributes includes one or more of:

number of times the same or similar first identity element is used with a different third identity data element, number of times the same or similar second identity data element is used with a different first identity data element, number of times the same or similar second identity data element with a different third identity data element, number of times the same or similar third identity data element is used with a different first identity data element, number of different first identity data elements in a given time period, number of different third data elements in a given time period;

applying by the computer processor the fraud model using the fourth set of calculated attributes to predict a likelihood of fraud;

generating by the computer processor the second fraud score based on the applying the fraud model using the second set of calculated attributes.

5. A computer system for fraud monitoring, the computer system comprising:

a computer processor configured to execute modules comprising at least:

a data access module configured to access consumer data related to a consumer, the consumer data comprising a first identity data element, a second identity data element and a third identity data element;

an inquiry record access module configured to receive a set of credit inquiry records, wherein the set of credit inquiry records comprises requests received from third parties for credit bureau data for the consumer within a predetermined time period, each of the credit inquiry records of the subset comprising a first identity data element, a second identity data element and a third identity data element;

a first association module configured to associate the consumer with at least one of the records of the credit inquiry records based on the first identity data element of the consumer being the same or similar to the first identity data element of the at least one credit inquiry record;

a first scoring module configured to calculate a first fraud score based on, for the credit inquiry records associated with the consumer, comparing the second identity data element of the consumer to each of the second identity data elements of the associated credit inquiry records;

comparing the third identity data element of the consumer to each of the third identity data elements of the associated credit inquiry records;

calculating a first set of attributes for the consumer based on the comparisons of the second identity data elements and the third identity data elements, wherein the first set of attributes includes one or more of:

number of times the same or similar first identity data element is used with a different second identity data element, number of times the same or similar first identity element is used with a different third identity data element, number of times the same or similar second identity data element with a different third identity data element, number of times the same or similar third identity data element with a different second identity data element, number of different second data elements in a given time period, or number of different third data elements in a given time period;

applying by the computer processor a fraud model using the first set of calculated attributes to predict a likelihood of fraud;

generating by the computer processor a first fraud score based on the applying the fraud model using the first set of calculated attributes;

a second association module configured to associate the consumer with at least one of the records of the credit inquiry records based on the second identity data element of the consumer being the same or similar to the second identity data element of the at least one credit inquiry record;

a second scoring module configured to calculate a second fraud score based on, for the credit inquiry records associated with the consumer, comparing the first identity data element of the consumer to each of the first identity data elements of the associated credit inquiry records;

comparing the third identity data element of the consumer to each of the third identity data elements of the associated credit inquiry records;

calculating a second set of attributes for the consumer based on the comparisons of the first identity data elements and the third identity data elements, wherein the second set of attributes includes one or more of:

number of times the same or similar first identity element is used with a different third identity data element, number of times the same or similar second identity data element is used with a different first identity data element, number of times the same or similar second identity data element with a different third identity data element, number of times the same or similar third identity data element is used with a different first identity data element, number of different first identity data elements in a given time period, number of different third data elements in a given time period;

applying by the computer processor a fraud model using the second set of calculated attributes to predict a likelihood of fraud;

generating by the computer processor a second fraud score based on the applying the fraud model using the second set of calculated attributes; and an overall scoring module configured to calculate an overall fraud score using the first fraud score and the second fraud score; and an output module configured to output the overall fraud score.

6. The computer system for fraud monitoring of claim 5, wherein each of the plurality of first, second and third identity data elements comprises one of a name of the consumer, a social security number of the consumer, a telephone number of the consumer, or an address of the consumer.

7. The computer system for fraud monitoring of claim 5, wherein the overall fraud score is further based on a number of inquiry records associated with the consumer.

8. The computer system of claim 5, wherein the inquiry record access module is further configured to receive a set of authentication inquiry records, wherein the set of authentication inquiry records comprises inquiries received from third parties to a credit bureau received within a predetermined time period, and wherein each inquiry is a request to verify and/or authenticate an identity or identification information of the consumer, each of the authentication inquiry records of the subset comprising a first identity data element, a second identity data element and a third identity data element;

wherein the first association module is further configured to associate the consumer with at least one of the records of the authentication inquiry records based on the first identity data element of the consumer being the same or similar to the first identity data element of the at least one authentication inquiry record;

wherein the first scoring module is further configured to calculate the first fraud score based on, for the authentication inquiry records associated with the consumer, comparing the second identity data element of the consumer to each of the second identity data elements of the associated authentication inquiry records;

comparing the third identity data element of the consumer to each of the third identity data elements of the associated authentication inquiry records;

calculating the first set of attributes for the consumer based on the comparisons of the second identity data elements and the third identity data elements, wherein the first set of attributes includes one or more of:

number of times the same or similar first identity data element is used with a different second identity data element, number of times the same or similar first identity element is used with a different third identity data element, number of times the same or similar second identity data element with a different third identity data element, number of times the same or similar third identity data element with a different second identity data element, number of different second data elements in a given time period, or number of different third data elements in a given time period;

applying by the computer processor the fraud model using the first set of calculated attributes to predict a likelihood of fraud;

generating by the computer processor the first fraud score based on the applying the fraud model using the third set of calculated attributes;

wherein the second association module is further configured to associate the consumer with at least one of the records of the authentication inquiry records based on the second identity data element of the consumer being the same or similar to the second identity data element of the at least one authentication inquiry record;

wherein the second scoring module is further configured to calculate the second fraud score based on, for the authentication inquiry records associated with the consumer, comparing the first identity data element of the consumer to each of the first identity data elements of the associated authentication inquiry records;

comparing the third identity data element of the consumer to each of the third identity data elements of the associated authentication inquiry records;

calculating the second set of attributes for the consumer based on the comparisons of the first identity data elements and the third identity data elements, wherein the second set of attributes includes one or more of:

number of times the same or similar first identity element is used with a different third identity data element, number of times the same or similar second identity data element is used with a different first identity data element, number of times the same or similar second identity data element with a different third identity data element, number of times the same or similar third identity data element is used with a different first identity data element, number of different first identity data elements in a given time period, number of different third data elements in a given time period;

applying by the computer processor the fraud model using the second set of calculated attributes to predict a likelihood of fraud;

generating by the computer processor the second fraud score based on the applying the fraud model using the second set of calculated attributes.

* * * * *